US010574549B2

(12) United States Patent
Kobayashi et al.

(10) Patent No.: US 10,574,549 B2
(45) Date of Patent: Feb. 25, 2020

(54) DEVICE AND METHOD FOR REPORTING ACCESS TO ACCESS POINT

(71) Applicant: FUJITSU LIMITED, Kawasaki-shi, Kanagawa (JP)

(72) Inventors: Masayuki Kobayashi, Sendai (JP); Takashi Okamura, Yokohama (JP); Hiroyuki Nambu, Kawasaki (JP); Shu Matsuoka, Shibuya (JP); Kaoru Kenjo, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 166 days.

(21) Appl. No.: 15/638,097

(22) Filed: Jun. 29, 2017

(65) Prior Publication Data
US 2018/0013649 A1 Jan. 11, 2018

(30) Foreign Application Priority Data

Jul. 7, 2016 (JP) .................. 2016-135374

(51) Int. Cl.
H04L 12/26 (2006.01)
H04W 8/26 (2009.01)
(Continued)

(52) U.S. Cl.
CPC .......... *H04L 43/0811* (2013.01); *H04W 8/26* (2013.01); *H04W 28/18* (2013.01); *H04W 76/11* (2018.02);
(Continued)

(58) Field of Classification Search
CPC ..... H04W 84/12; H04W 88/08; H04W 24/10; H04W 48/16; H04W 48/20; H04W 24/00;
(Continued)

(56) References Cited

U.S. PATENT DOCUMENTS

2008/0174491 A1* 7/2008 Kim ................ H04W 4/02 342/450
2009/0163170 A1* 6/2009 Norp ............. G08B 27/006 455/404.1
(Continued)

FOREIGN PATENT DOCUMENTS

JP 2014-179819 9/2014
JP 2015-141491 A 8/2015
JP 2016-52062 A 4/2016

OTHER PUBLICATIONS

Japanese Office Action dated Nov. 19, 2019 for corresponding Japanese Patent Application No. 2016-135374, with English Translation, 7 pages.

*Primary Examiner* — Djenane M Bayard
(74) *Attorney, Agent, or Firm* — Fujitsu Patent Center

(57) ABSTRACT

A reporting method includes: obtaining an address that is assigned to a target device and that is included in a control signal used for a communication with an access point in a plurality of access points; storing identification information in a storage in association with the address of the target device; storing, when receiving report destination information, the report destination information in the storage in association with the address of the target device if identification information reported in association with the report destination information is stored in the storage; referring to the storage when obtaining information of a control signal received by one of the plurality of access points; and reporting, when a source address of the control signal exists in the storage, to a report destination stored in association with the source address that there is an access from the target device.

11 Claims, 18 Drawing Sheets

(51) Int. Cl.
*H04W 76/11* (2018.01)
*H04W 28/18* (2009.01)
*H04W 76/19* (2018.01)
*H04L 1/00* (2006.01)
*H04W 48/16* (2009.01)

(52) U.S. Cl.
CPC .......... *H04L 1/0016* (2013.01); *H04W 48/16* (2013.01); *H04W 76/19* (2018.02)

(58) Field of Classification Search
CPC ..... H04W 88/06; H04W 24/04; H04W 48/14; H04W 72/042; H04W 8/005; H04W 12/12; H04W 12/06; H04W 64/00; H04W 72/082; H04W 24/02; H04W 36/0061; H04W 36/0083; H04W 48/10; H04W 48/12; H04L 47/14; H04L 69/14; H04L 12/2856; H04L 47/2408; H04L 1/1607; H04L 45/00; H04L 47/125; H04L 47/24; H04L 49/351; H04L 63/101; H04L 67/14; H04L 67/18; H04L 67/327; H04L 69/18; H04L 69/324; H04L 69/329; H04L 45/04; H04L 45/28; H04L 45/48; H04L 61/2592; H04L 69/32; H04L 69/40; H04L 41/0806; H04L 41/0893; H04L 45/02; H04L 45/22; H04L 45/26; H04L 47/801; H04L 49/201; H04L 12/14; H04L 12/1403; H04L 41/0663; H04L 41/12; H04L 41/22; H04L 43/00; H04L 43/12; H04L 45/24; H04L 45/245; H04L 45/60; H04L 45/64; H04L 47/15; H04L 47/193; H04L 47/70; H04L 47/767; H04L 47/781; H04L 47/785; H04L 47/822; H04L 47/824; H04L 49/205; H04L 49/254; H04L 5/0073; H04L 63/08; H04L 63/0853; H04L 63/10; H04L 63/18; H04L 12/189; H04L 12/2861; H04L 12/4633; H04L 12/5692
See application file for complete search history.

(56) References Cited

U.S. PATENT DOCUMENTS

| | | | |
|---|---|---|---|
| 2011/0103344 A1* | 5/2011 | Gundavelli | H04W 8/005 370/331 |
| 2012/0281585 A1* | 11/2012 | Zhang | H04W 36/0033 370/252 |
| 2014/0266578 A1 | 9/2014 | Yasukawa | |

* cited by examiner

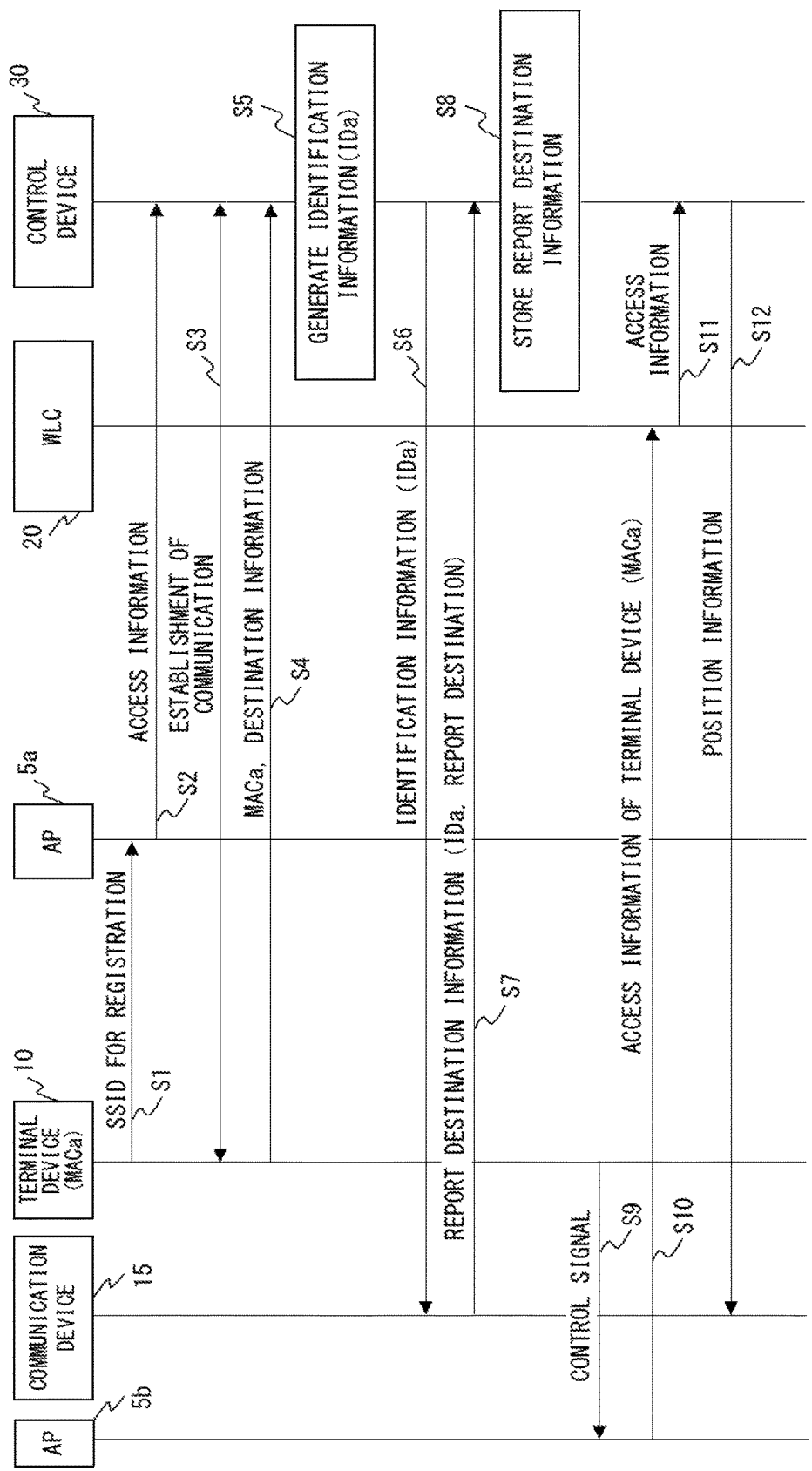
F I G. 2

| AP | MAC | DATE | TYPE |
|---|---|---|---|
| AP 5c | MAC x | 6/10 10:00 | VALIDATION REQUEST |
| AP 5d | MAC b | 6/10 11:00 | PROBE REQUEST |
| AP 5a | MAC a | 6/10 10:15 | PROBE REQUEST |

FIG. 12

| ACCESS POINT | INSTALLATION POSITION |
|---|---|
| AP5a | CITY HALL |
| AP5b | COMMUNITY CENTER A |
| AP5c | GYMNASIUM OF ELEMENTARY SCHOOL Y |
| AP5d | LIBRARY OF ELEMENTARY SCHOOL Y |

FIG. 14

DEVICE AND METHOD FOR REPORTING ACCESS TO ACCESS POINT

CROSS-REFERENCE TO RELATED APPLICATION

This application is based upon and claims the benefit of priority of the prior Japanese Patent Application No. 2016-135374, filed on Jul. 7, 2016, the entire contents of which are incorporated herein by reference.

FIELD

The embodiments discussed herein are related to a device and method for reporting an occurrence of an access to an access point to a prescribed destination.

BACKGROUND

There is increasing demand for services of monitoring elderly people, children or other people, and various monitoring systems that make use of devices etc. having a sensor are proposed. For example, a system that monitors statuses, such as sitting up, getting out of a bed, etc., of a patient in a hospital room or his or her own room is proposed. Further, a method of determining (or estimating), from the communication condition of a wireless communication device, whether the user is in or out of an area in which communications are possible is proposed (Japanese Laid-open Patent Publication No. 2014-179819).

However, monitoring targets such as elderly people, children or other people do not always stay in a particular room such as a hospital room, his or her own room, etc., depending upon his or her health condition. Thus, it is desirable to be able to provide a monitoring service over a wide area. However, it is difficult for methods that use a sensor or an RFID (radio frequency identifier) as disclosed by Japanese Laid-open Patent Publication No. 2014-179819 or other publications to provide a monitoring service over a wide area.

SUMMARY

According to an aspect of the present invention, A non-transitory computer-readable recording medium stores a program for causing a computer that controls a network including a plurality of access points to execute a reporting process. The reporting process includes: obtaining an address that is assigned to a target device configured to communicate with one of the plurality of access points and that is included in a control signal used for a communication with the access point; storing identification information in a storage unit in association with the address of the target device; storing, when receiving report destination information used for identifying a report destination for information of the target device, the report destination information in the storage unit in association with the address of the target device when identification information reported in association with the report destination information is stored in the storage unit; referring to the storage unit when obtaining information of a control signal received by one of the plurality of access points; and reporting, when a source address of the control signal exists in the storage unit, to a report destination stored in association with the source address that there is an access from the target device.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 2 illustrates an example of a position information reporting method according to an embodiment;
FIG. 12 illustrates an example of a log;
FIG. 14 illustrates an example of an access point information table.

DESCRIPTION OF EMBODIMENTS

Figure 1:
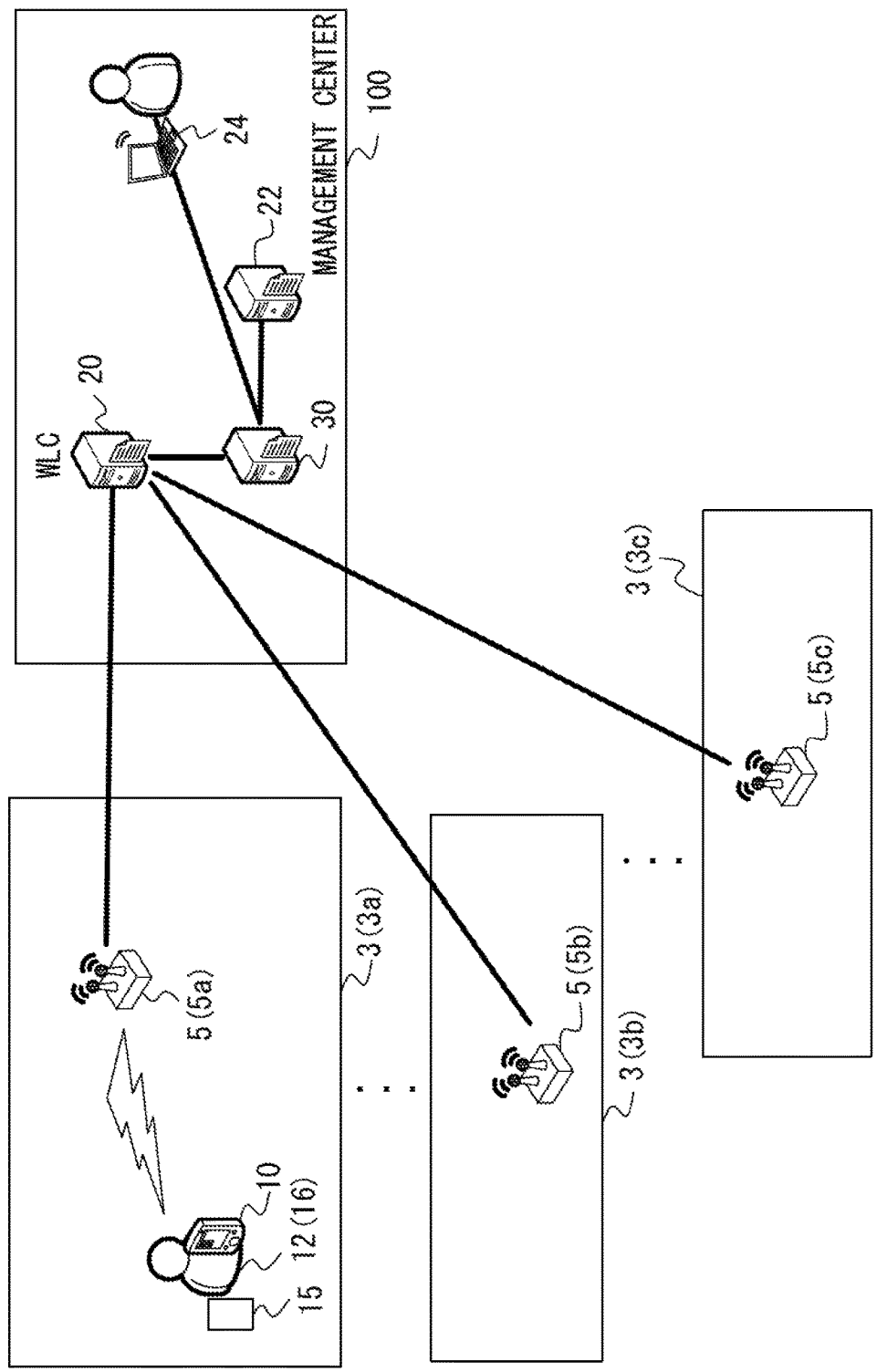
FIG. 1 illustrates an example of a communication system.

FIG. 1 illustrates an example of a communication system according to an embodiment. The system according to an embodiment includes a management center 100 and at least one communication area 3. The management center 100 includes a wireless LAN (Local Area Network) controller (WLC or Wireless LAN Controller) 20 that manages an access point 5 and a control device 30. The management center 100 may further include a management device 24 that manages a registration status, a mail server 22 that processes a mail when a mail is used for performing a report process, or other units. The wireless LAN controller 20 obtains, from each of the access points 5 in the system, information about a communication device connected to that access point 5 and so on, and reports the obtained information to the control device 30. The control device 30 controls communication processes in the system. For example, the control device 30 may be implemented by an SDN (Software-Defined Networking) controller.

The communication area 3 is an area where a communication device can perform wireless communications by using radio waves transmitted from the access point 5. While the example illustrated in FIG. 1 illustrates communication areas 3a through 3c, the system may have an arbitrary number of the communication areas 3. In FIG. 1, the communication area 3a is formed based on the access point 5a. Similarly, the communication area 3b is formed based on the access point 5b, and the communication area 3c is formed based on the access point 5c.

Hereinafter, explanations will be given for an example from the registration for a monitoring service to a report process of the position of a particular person in the monitoring service by referring to an example where a client makes registration for the monitoring service in the communication area 3a. In the explanations below, a person whose position is monitored by a monitoring service may be referred to as a "monitoring target (or a monitoring target person)". It is assumed that a monitoring target person carries a terminal device 10 after the registration for a monitoring service and the system identifies the position of the terminal device 10. Meanwhile, it is also assumed that the client 12 performs a registration process and receives a position report by using the communication device 15.

FIG. 2 illustrates an example of a position information reporting method according to an embodiment. In the explanations below, it is assumed that each of the access points 5a through 5c can perform communications that uses an SSID (Service Set Identifier) for registration for the monitoring service in addition to communications that uses an SSID for communications. It is also assumed that the control device 30 in advance stores the positions of all the access points 5 installed in the system.

It is assumed that the client 12 has entered the communication area 3a, carrying the terminal device 10 that is to be held by the monitoring target person and the communication device 15 that is used by the client 12 himself or herself, in order to make registration for the monitoring service. The client 12 uses the terminal device 10 to access the access point 5a with an SSID for registration (step S1). The access point 5a reports, to the control device 30 via the wireless LAN controller 20, information indicating the occurrence of an access with an SSID for registration (step S2). In response to this, the control device 30 establishes a communication with the terminal device 10 (step S3). Note in step 3 that a communication between the terminal device 10 and the control device 30 may start in response to the terminal device 10 making a request to the control device 30 for information related to a registration process or may start in response to the control device 30 transmitting particular data to the terminal device 10. Further, in a case where the terminal device 10 makes a request to the control device 30 for information related to a registration process, the terminal device 10 may obtain the information from the control device 30 in response to a redirection process performed by the wireless LAN controller 20 in step S2.

When a communication starts between the terminal device 10 and the control device 30, the terminal device 10 reports, to the control device 30, information of the destination for a registration process (destination information) and the MAC (Media Access Control) address assigned to the terminal device 10 (step S4). It is assumed in the example of FIG. 2 that a MAC address of MACa is assigned to the terminal device 10. Destination information is arbitrary information that can be used for accessing the communication device 15 from the control device 30. For example, the address of a mail that the client 12 can receive by using the communication device 15, the address information of the communication device 15, etc. can be used as destination information.

The control device 30 stores destination information reported together with the MAC address of the terminal device 10, in association with a MAC address (MACa). Further, the control device 30 generates identification information for identifying an access related to registration of a monitoring service that uses the terminal device 10, in association with the MAC address of the terminal device 10 (step S5). In this example, identification information may be one type of information or may be a combination of a plurality of types of information such as an ID and a pass word. It is assumed in the example of FIG. 2 that identification information IDa is generated and is stored in the control device 30 in association with an address of MACa.

The control device 30 reports, to the communication device 15, identification information generated for an access related to registration of a monitoring service that uses the terminal device 10 (step S6). In this example, the reporting of identification information may be performed in a form that the identification information is reported as data or may be performed in a form that the identification information is included in information used for an access to a registration window etc. associated with the identification information.

The client 12 inputs, to the communication device 15, a report destination for the result of position information of a monitoring target person. Then, a process in an application operating in the communication device 15 reports the report destination input to the communication device 15 to the control device 30, in association with identification information reported from the control device 30 (step S7). It is assumed for example that a mail address that is set to be received by the communication device 15 has been reported to the control device 30 as a report destination in association with identification information. Then, the control device 30 stores the information of the report destination in association with the MAC address and the identification information of the terminal device 10 (step S8). In the example illustrated in FIG. 2, the control device 30 stores a mail address reported from the communication device 15, in association with MACa, which is the MAC address of the terminal device 10, and/or identification information IDa.

It is assumed that a monitoring target person carrying the terminal device 10 has entered the communication area 3b after the completion of a registration process. Then, the terminal device 10 transmits a control signal to the access point 5b that forms the communication area 3b (step S9). It is assumed that a control signal is an arbitrary signal that is used for an arbitrary control process and that includes the MAC address of a transmission source. For example, the control signal may be a probe request, a validation request, etc. Upon receiving the control signal, the access point 5b reports, to the wireless LAN controller 20, access information including the MAC address of the terminal device 10 included in the control signal (step S10). The wireless LAN controller 20 reports the access information of the terminal device 10 to the control device 30 together with the identification information of the access point 5b that the terminal device 10 is accessing (step S11).

The control device 30 compares the MAC address in information reported from the wireless LAN controller 20 with the MAC address of a device whose position is to be identified by the monitoring service. This makes it possible for the control device 30 to detect that an access from the terminal device 10 occurred, when the access information including a MACa is reported in step S11. The control device 30 uses the reported identification information of the access point 5b to read information of the access point 5b from a storage unit having stored access point information, associates identification information and information related to access points, and reports the read information to the communication device 15 (step S12). The client 12 who refers to the contents reported to the communication device 15 can recognize the reported access point information as the position information of the monitoring target person. Note that information related to an access point may be the longitude and latitude at which the access point is installed, may be the address at which the access point is installed or may be the name of the facility in which the access point is installed. A configuration may be employed in which when reporting the longitude and latitude, the address of a service that provides information in accordance with the longitude and latitude is added so that the longitude and latitude can be received by the client 12 as understandable information.

As described above, a system that reports the status of a target by using existing infrastructure equipment such as the access point 5 and a device carried by a target who is to be monitored can be implemented easily. Also, when systems like this can be implemented easily, the provision of monitoring services becomes easier, leading to an increase in companies that provide monitoring services. This increases the possibility that facilities that a target visits in daily life will start such services, leading to better circumstances in which monitoring services can be registered.

While explanations have been given for a case where the position of a monitoring target person is reported with reference to FIG. 2, the process may be modified to report, to the communication device 15, the detection of an access from the terminal device 10, instead of the position information. In a case of a system that reports, to the communication device 15, the detection of an access from the terminal device 10, the client 12 can confirm the report to the communication device 15 so as to recognize that the monitoring target person is near one of the access points 5 in the system. Also, when receiving a report that the monitoring target person has entered the communication area 3, the client 12 can recognize that the monitoring target person holding the terminal device 10 is in a status in which he or she can move. This modification reduces the process loads because the control device 30 does not identify positions.

<Device Configuration>

Figure 3:
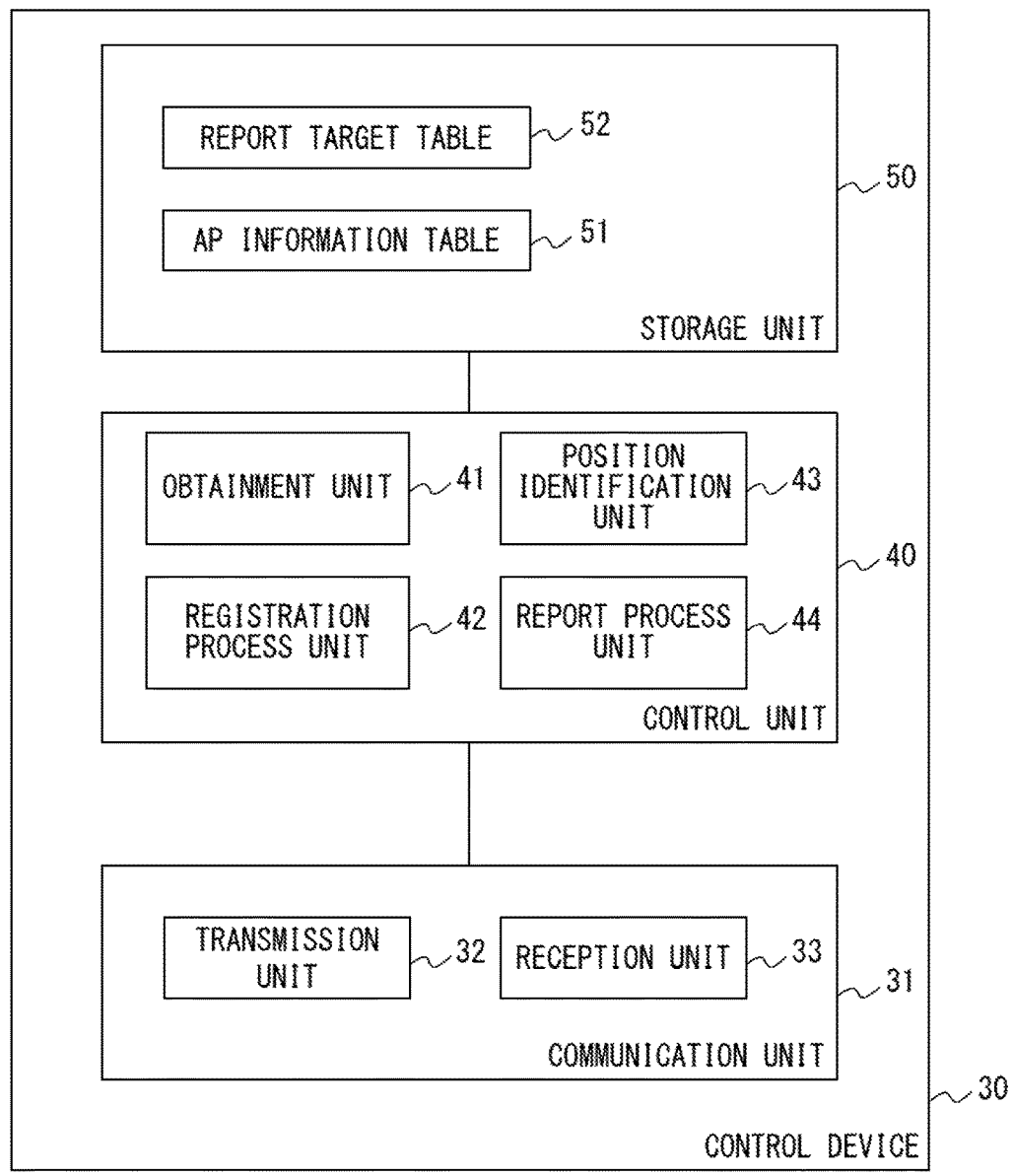
FIG. 3 illustrates an example of a configuration of a control device.

FIG. 3 illustrates an example of the control device 30. The control device 30 includes a communication unit 31, a control unit 40 and a storage unit 50. The communication unit 31 includes a transmission unit 32 and a reception unit 33. The control unit 40 includes an obtainment unit 41, a registration process unit 42, a position identification unit 43 and a report process unit 44. The storage unit 50 holds an access point (AP) information table 51 and a report target table 52.

The access point information table 51 associates the installation position and the identification information of an access point for each of the access points 5 in the system. The report target table 52 associates the MAC address and the report destination of the terminal device 10 for each terminal device 10. The report target table 52 is generated through processes performed by the registration process unit 42 and the position identification unit 43.

The transmission unit 32 transmits a packet to other devices such as the wireless LAN controller 20, the terminal device 10, etc. The reception unit 33 receives a packet from other devices such as the terminal device 10, the wireless LAN controller 20, etc.

The obtainment unit 41 obtains the MAC address of the terminal device 10 and information of the communication device 15 that performs a registration process for the terminal device 10 from a packet received via the reception unit 33, and records the obtained information in the report target table 52. The registration process unit 42 uses information received from the communication device 15 so as to update information in the report target table 52, and thereby performs a registration process of information of a destination to which the current position of the terminal device 10 is reported. The position identification unit 43 uses history of a communication status obtained from the wireless LAN controller 20 so as to identify the access point to which the terminal device 10 is currently connected. The report process unit 44 performs a process for reporting the installation position of an access point identified by the position identification unit 43 to a report destination device. The report process unit 44 uses the access point information table 51 so as to perform a process for identifying the installation position of an access point in order to transmit a report message including the identified information to a report destination.

Figure 4:
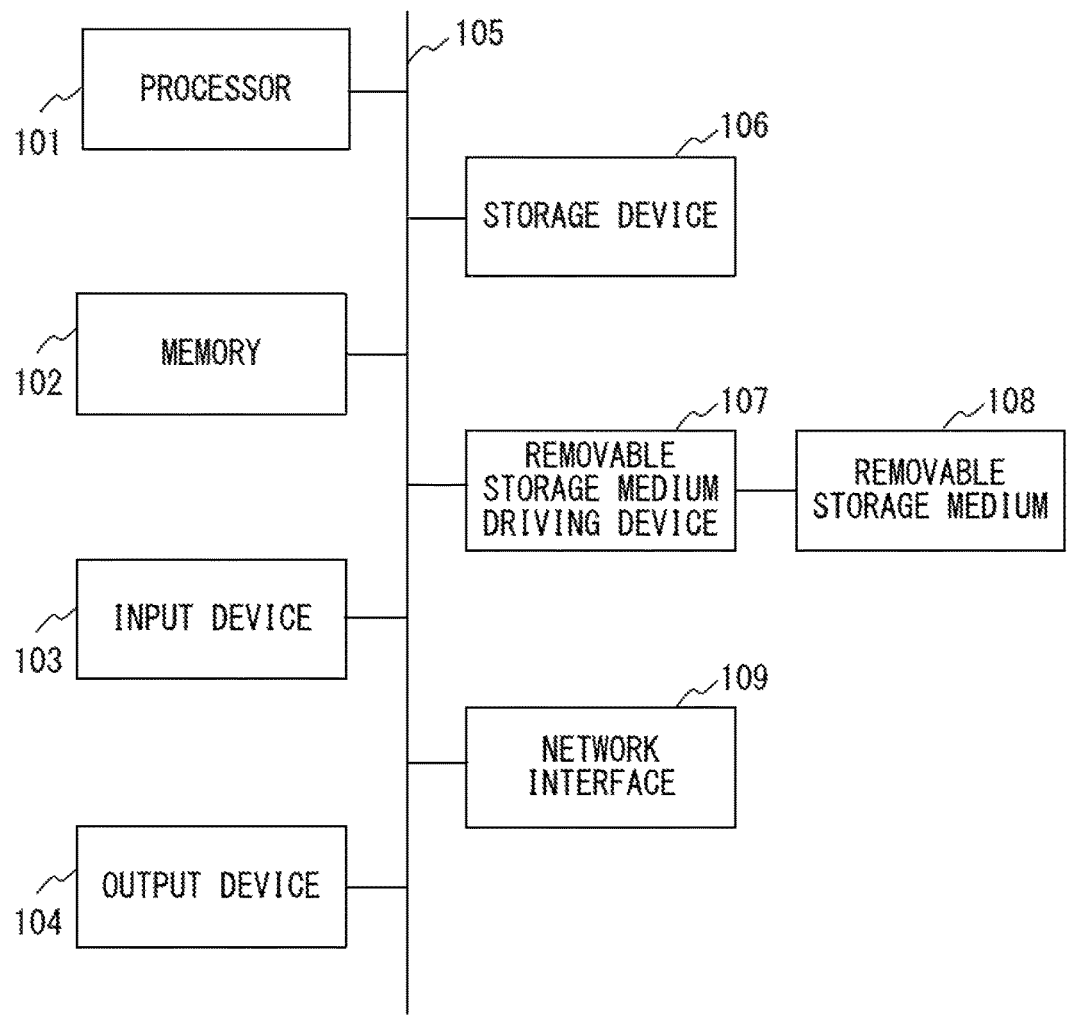
FIG. 4 illustrates an example of a hardware configuration of the control device.

FIG. 4 illustrates an example of a hardware configuration of the control device 30. The control device 30 includes a processor 101, a memory 102, a bus 105 and a network interface 109. The control device 30 may further include at least one of an input device 103, an output device 104, a storage device 106 and a removable storage medium driving device 107.

The processor 101 is an arbitrary process circuit including a Central Processing Unit (CPU), and can execute a program stored in the memory 102 or the storage device 106. The bus 105 connects the processor 101, the memory 102, the input device 103, the output device 104, the storage device 106, the removable storage medium driving device 107 and the network interface 109 so that data can be exchanged between them. The input device 103 is an arbitrary device, such as a keyboard, a mouse, etc., that is used for inputting information, and the output device 104 is an arbitrary device, such as a display device, that is used for outputting data. The removable storage medium driving device 107 can output data of the memory 102 or the storage device 106 to a removable storage medium 108, and can read a program, data, etc. from the removable storage medium 108. In this example, the removable storage medium 108 can be an arbitrary storage medium including a Compact Disc Recordable (CD-R) and a Digital Versatile Disk Recordable (DVD-R).

In the control device 30, the processor 101 may operate as the control unit 40. In the control device 30, the memory 102 and the storage device 106 may operate as the storage unit 50, and the network interface 109 may operate as the communication unit 31.

First Embodiment

Hereinafter, the first embodiment will be divided into the sections of a registration process, authentication of registration, generation of a log in the wireless LAN controller, and identification and reporting of position information in a control device so that explanations will be given for them respectively. Note that authentication of registration is a process for enhancing the security, and reporting of position information of a monitoring target person may be started immediately after a registration process, omitting an authenticate process of registration, as described by referring to FIG. 2 or other figures.

(1) Registration Process

It is assumed that information such as the position of the access point 5 that for which a registration process for the monitoring system is possible, an SSID that can be used for the registration process, etc. has been reported in advance to the client 12 who is going to make registration for the monitoring system or to the monitoring target person. It is further assumed that the control device 30 in advance holds information of a registration form used for a registration process, an input window for a report destination for information included in a registration form (destination report window of a registration form). It is also assumed that the wireless LAN controller 20 holds a URI (Uniform Resource Identifier) used for identifying the storage position of a destination report window.

Figure 5:
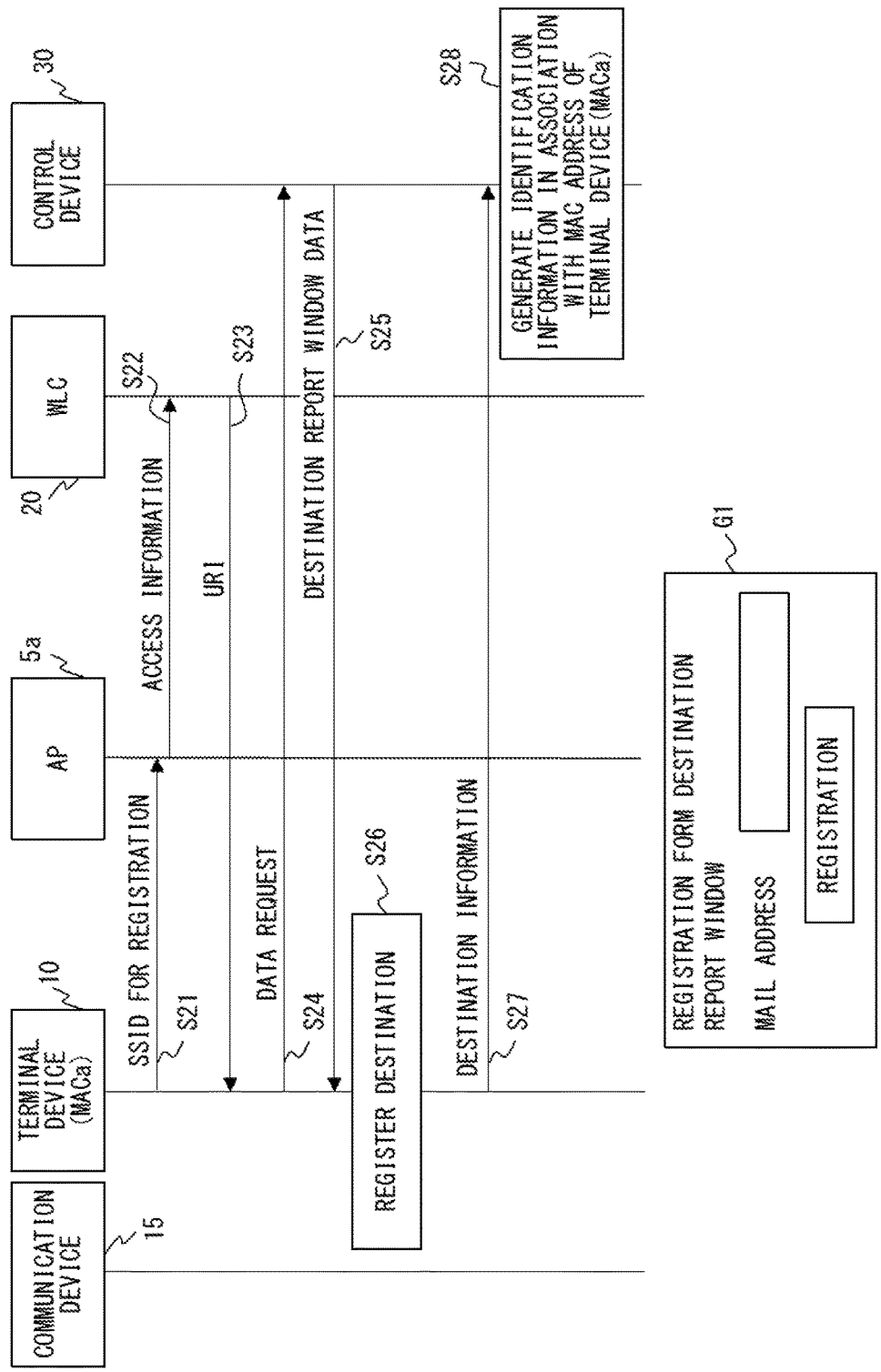
FIG. 5 illustrates an example of a method of obtaining information of a device that performs a registration process.

FIG. 5 illustrates an example of a method of obtaining information of a device that performs a registration process. The client 12 who is going to make registration for the monitoring system or a monitoring target person enters, while carrying the terminal device 10, the communication area of the access point 5a and accesses the access point 5a through the terminal device 10 by using an SSID for registration (step S21). The access point 5a reports, to the wireless LAN controller 20, that the terminal device 10 is making an access by using an SSID (step S22). The wireless LAN controller 20 records the MAC address of the terminal device 10 that has made an access by using an SSID for registration in a list (see L1 in FIG. 6). Note that steps S21 and S22 in FIG. 5 each have just one arrow for indicating the transmission direction just to facilitate understanding of the chart. In other words, the number of signals that are transmitted or received between the terminal device 10 and access point 5a in step S21 and the number of reports transmitted from the access point 5a to the wireless LAN controller 20 in step S22 may arbitrarily be changed in association with implementation. Further, a signal may be transmitted from the access point 5 to the terminal device 10 in parallel to step S21 or S22. Note that the wireless LAN controller 20 receiving a report in step S22 adds, to list L1, information of the terminal device 10 if the information has not been included in list L1.

It is assumed that the wireless LAN controller 20 in step S22 has received a report that the terminal device 10 transmitted an HTTP (Hypertext Transfer Protocol) packet to the access point 5a by using an SSID. In the example illustrated in FIG. 5, when the terminal device 10 transmits an HTTP packet by using an SSID for registration, the wireless LAN controller 20 determines that the terminal device 10 is making an access to the registration system in order to perform a registration process. Then, the wireless LAN controller 20 reports, to the terminal device 10, the URI at which the destination report window is stored as the information of the destination report window of a registration form (step S23). The terminal device 10 uses the URI reported from the wireless LAN controller 20 so as to make a request to the wireless LAN controller 20 for the data of the destination report window (step S24). Note that the processes in steps S23 and S24 may be configured in such a manner that the terminal device 10 accesses the control device 30 by an HTTP redirection process performed by the wireless LAN controller 20.

The reception unit 33 in the control device 30 receives a data request of the destination report window transmitted from the terminal device 10, and guides the data request of the destination report window to the obtainment unit 41. In response to the data request of a destination report window, the obtainment unit 41 transmits, to the terminal device 10 via the transmission unit 32, the data of a destination report window that is held by the obtainment unit 41 in advance (step S25). The terminal device 10 processes data received from the control device 30 so as to display a destination report window of a registration form in a screen included in the terminal device 10.

Window G1 illustrated in FIG. 5 is a display example of a destination report window of a registration form. The example of window G1 illustrates a case where a mail address is used for identifying a transmission destination for a registration form. The destination report window of a registration form includes a text box for inputting a mail address and a button for registration. When a destination report window of a registration form as illustrated as window G1 is displayed on the terminal device 10, the client 12 or the monitoring target person inputs, to a text box, a mail address serving as a destination for a mail that can be received by a device that they hope displays a registration form. Thereafter, the client 12 or the monitoring target person pushes the registration button in window G1. These processes correspond to a process of registering a destination for registration form information from a destination report window (step S26). When the registration button is pushed in window G1, the terminal device 10 associates the mail address recorded in the text box in window G1 with the MAC address assigned to the terminal device 10 (MACa) so as to transmit them toward the control device 30 (step S27). It is assumed for example that an address of aaa@example.com that is a mail address that can be received by the communication device 15 was reported to the control device 30 by using the registration window illustrated in as G1.

The reception unit 33 in the control device 30 guides the received information to the obtainment unit 41. Thus, the obtainment unit 41 obtains a combination of mail addresses that can be received by the terminal device 10 and the communication device 15. The obtainment unit 41 generates identification information for identifying an access related to registration for a monitoring service that uses the terminal device 10, in association with the MAC address of the terminal device 10 (step S28). The obtainment unit 41 records the generated identification information in the report target table 52 together with the MAC address of the terminal device 10 and the information of the destination for registration form information.

Figure 6:
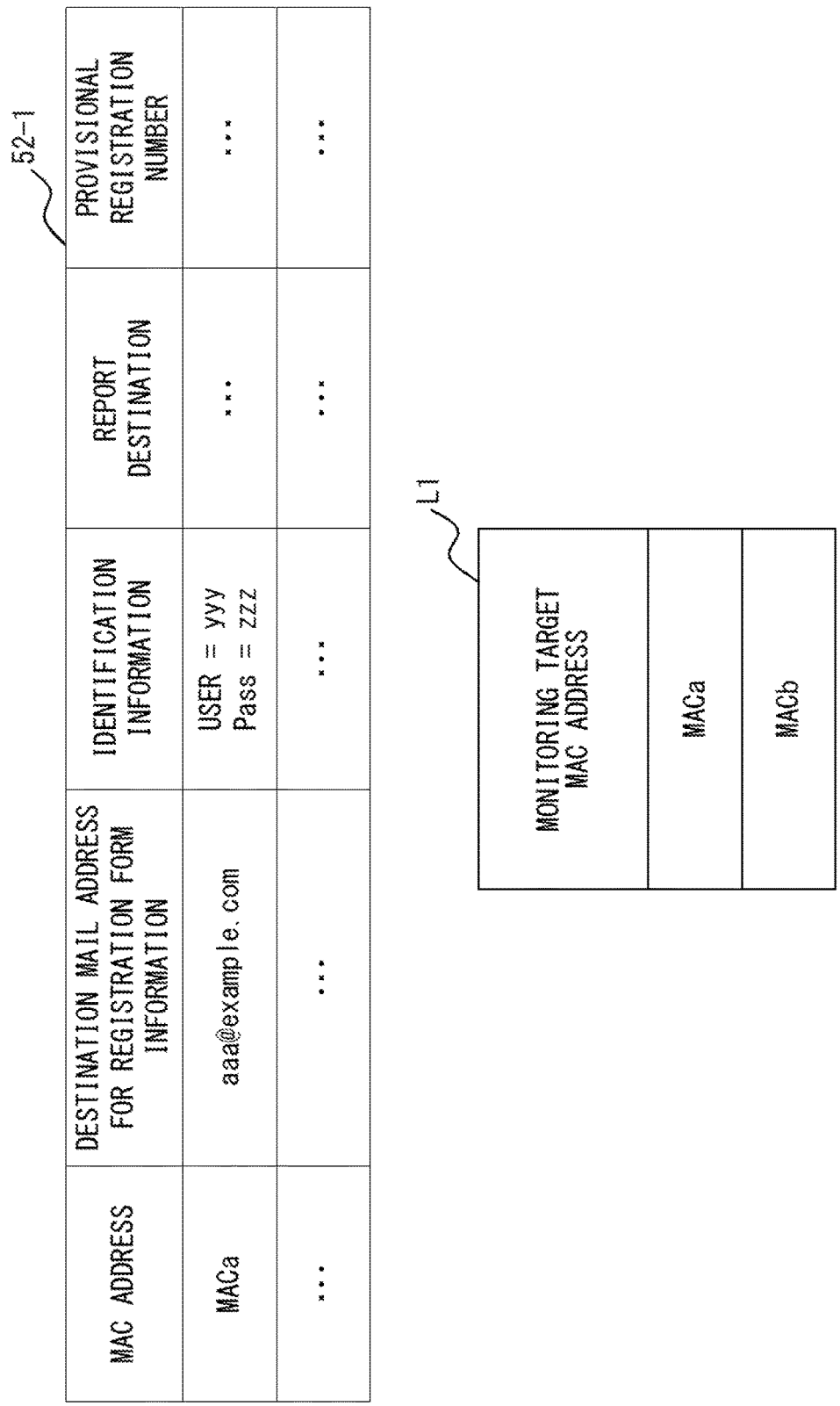
FIG. 6 illustrates examples of a report target table a list of monitoring targets.

FIG. 6 illustrates an example of the report target table 52. A report target table 52-1 includes MAC address, destination mail address of registration form information, identification information, report destination, and provisional registration number. A MAC address is a MAC address assigned to the terminal device 10 held by the monitoring target person. A destination mail address of registration form information is information of a report destination reported to the control device 30 by using the destination report window of the registration form (G1 in FIG. 5). Identification information is information for identifying a MAC address in each entry, and is used for identifying a registration process related to a device to which a MAC address in an entry is assigned. A report destination is a report destination for position information of a device to which a MAC address in each entry is assigned. A provisional registration number is a number issued by the control device 30 at the end of a registration process, and is used for authentication after the registration process.

The first entry in the report target table 52-1 is an example of information registered by the process explained by referring to FIG. 5. In step S27 of FIG. 5, the mail address (aaa@example.com) transmitted from the terminal device 10 to which MACa is assigned is recorded in association with the MAC address of the terminal device 10. In the example illustrated in FIG. 6, the obtainment unit 41 generates a combination of two pieces of information of USER=yyy and Pass=zzz as identification information in step S28. Note that the information of a report destination and the provisional registration number are not registered in the phase illustrated in FIG. 5 because the registration for the terminal device 10 to which MACa is assigned has not been completed.

List L1 is information held by the wireless LAN controller 20 as a device that is a target of the monitoring process. The wireless LAN controller 20 holds, in list L1, the MAC address of the terminal device 10 that accessed one of the access points 5 in the system by using an SSID for registration. In the example of list L1, the terminal device 10 to which MACa is assigned and another terminal device (not illustrated) to which MACb is assigned are recognized as the target of the monitoring process by the wireless LAN controller 20.

Figure 7:
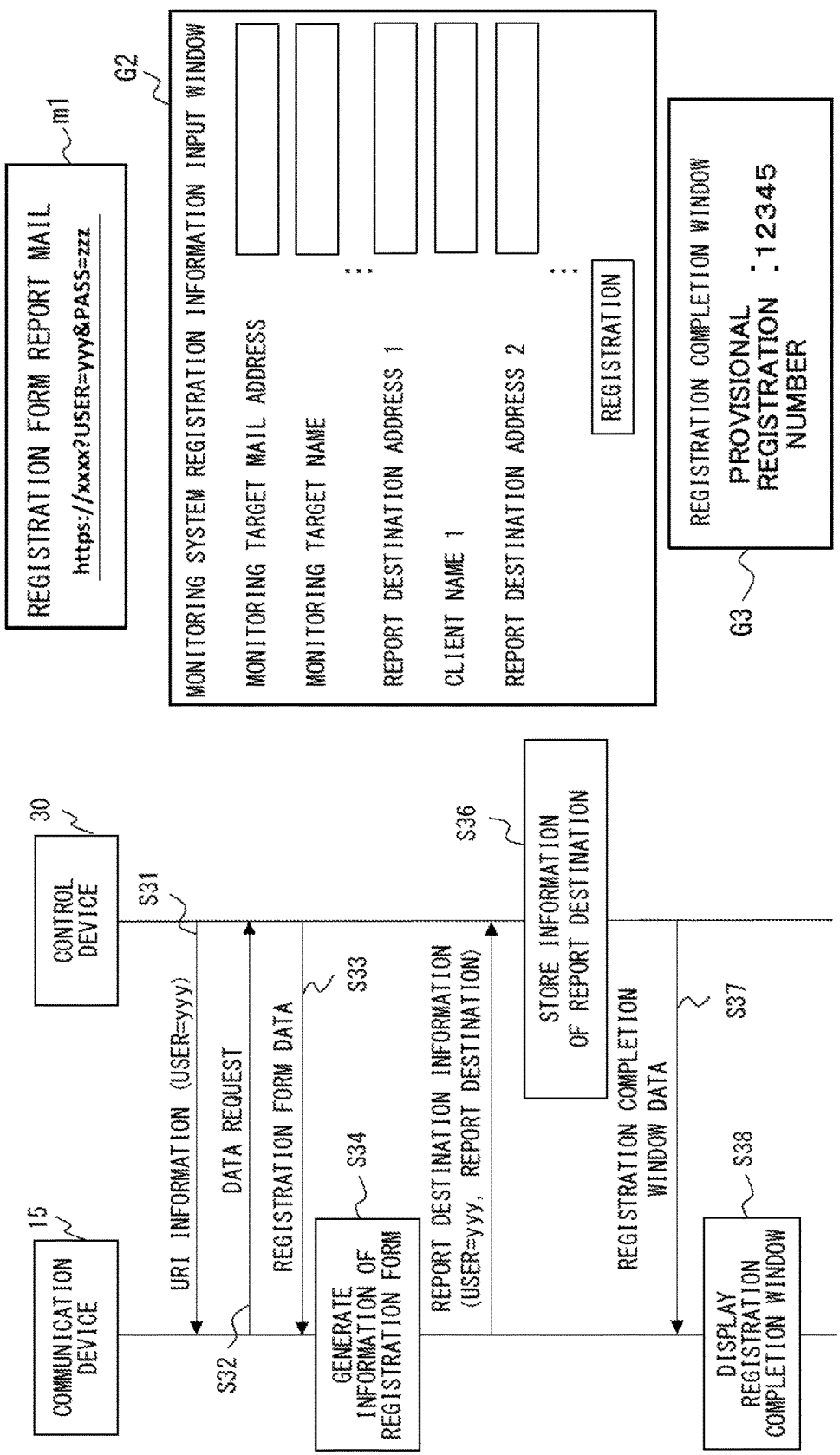
FIG. 7 illustrates an example of a registration process.

FIG. 7 illustrates an example of a registration process. The registration process unit 42 in the control device 30 generates a registration form window for obtaining a report destination for the position information of the terminal device 10 for the terminal device 10 for which identification information has been generated and for which report destination information has not been obtained. The registration process unit 42 holds a generated registration form in an area specified by an URI including identification information generated in association with the MAC address of the terminal device 10. For example, the registration process unit 42 stores a registration form for obtaining a report destination for the terminal device 10 to which MACa is assigned in an area specified by the URI of https://xxxx?USER=yyy&PASS=zzz.

Thereafter, the registration process unit 42 transmits a report including the information of a registration form to a destination reported as a destination for the registration form (step S31). Upon this, the report including the information of a registration form includes identification information generated for the terminal device 10. When for example the URI of a registration form used for registering the information of the terminal device 10 includes a combination of USER=yyy and PASS=zzz that is used as identification information, the registration process unit 42 reports the identification information to the communication device 15 by reporting the URI. The registration process unit 42 transmits, to aaa@example.com, a report mail for reporting the URI of a registration form that is used for obtaining a report destination for the terminal device 10 to which MACa is assigned. In such a case, mail m1 illustrated in FIG. 7 is transmitted to aaa@example.com. It is assumed that the mail to aaa@example.com is received by the communication device 15 via a mail server, etc. Note that when mail m1 is transmitted, the identification information is reported to the communication device 15 in a state that it is included in a URI.

The communication device 15 makes a request to the control device 30 for the data of a registration form by using the URI included in mail m1 (step S32). In response to the request from the communication device 15, the registration process unit 42 in the control device 30 transmits, to the communication device 15, the data of a registration form for obtaining a report destination for the terminal device 10 to which MACa is assigned (step S33).

Window G2 illustrates an example of a registration form used for registering a report destination for the terminal device 10 to which MACa is assigned. A registration form includes a text box for inputting a mail address of a report destination to which the position information of the monitoring target person holding the terminal device 10 is to be reported. When there are a plurality of report destinations for the position information of the monitoring target person holding the terminal device 10, information of the report destinations is registered by using the text boxes of report destination address 2 etc. in addition to the text box of report destination address 1. In the example illustrated in window G2, a text box for registering the name of the client 12 set as a report destination is also included in a registration form so that it can be used for a validation process to be performed after a registration process is terminated. The example illustrated as window G2 further includes text boxes for inputting the name of the monitoring target person and a mail address that can be received by the terminal device 10 held by the monitoring target person (monitoring target person mail address). From among the text boxes included in window G2, the text box for obtaining the information of a mail address that can be received by the terminal device 10 held by the monitoring target person is optional, and may be omitted from a registration form.

When receiving the information of a registration form, the communication device 15 displays a registration form (G2) in the screen included in the communication device 15. The client 12 uses an input device etc. of the communication device 15 so as to input the information of a report destination in a registration form, and pushes the registration button in the registration form. Then, the communication device 15 generates information of a registration form to which a report destination has been input (report destination registration information) (step S34). The communication device 15 transmits report destination registration information to the control device 30 (step S35). Because the report destination registration information has been generated in association with the information of a registration form, the report destination registration information includes the combination of the pieces of information of USER=yyy and PASS=zzz (identification information) and the information of the report destination input through a registration form.

In the control device 30, the registration process unit 42 obtains report destination registration information via the reception unit 33. The registration process unit 42 stores, in the report target table 52, the information of a report destination in association with identification information included in the report destination registration information (step S36). Here, identification information is associated with the MAC address of the terminal device 10 in the report target table 52. This associates the MAC address of the terminal device 10 held by the monitoring target person with a report destination for the position information of the terminal device 10 by using identification information. An example of storing a report destination will be described by referring to FIG. 8.

When a report destination has been stored, the registration process unit 42 generates a registration completion window. Window G3 is an example of a registration completion window. The registration completion window displays a provisional registration number used in a validation process. The example of window G3 illustrates a case where the provisional registration number is 12345.

The registration process unit 42 transmits registration completion window data to the communication device 15 via the transmission unit 32 (step S37). When receiving registration completion window data, the communication device 15 displays a registration completion window in the display device (step S38). This makes it possible for the client 12 to obtain a provisional registration number by checking information displayed by the communication device 15.

Figure 8:
FIG. 8 illustrates an example of a report target table.

FIG. 8 illustrates an example of the report target table 52 (report target table 52-2) generated in step S36. It is assumed in step S36 that aaa@example.com and mimamori_1@xx.yy were reported to the control device 30 as report destination registration information in association with a combination of USER=yyy and Pass=zzz. In such a case, the registration process unit 42 searches for an entry in an access point information table 51-1 (FIG. 6) by using identification information as a search key, and registers the address of a detected entry. Further, the registration process unit 42 also registers a provisional registration number reported to the communication device 15 in step S37 in an entry including a combination of USER=yyy and Pass=zzz. Thereby, the report target table 52-1 (FIG. 6) is updated to the report target table 52-2 (FIG. 8).

Figure 9:
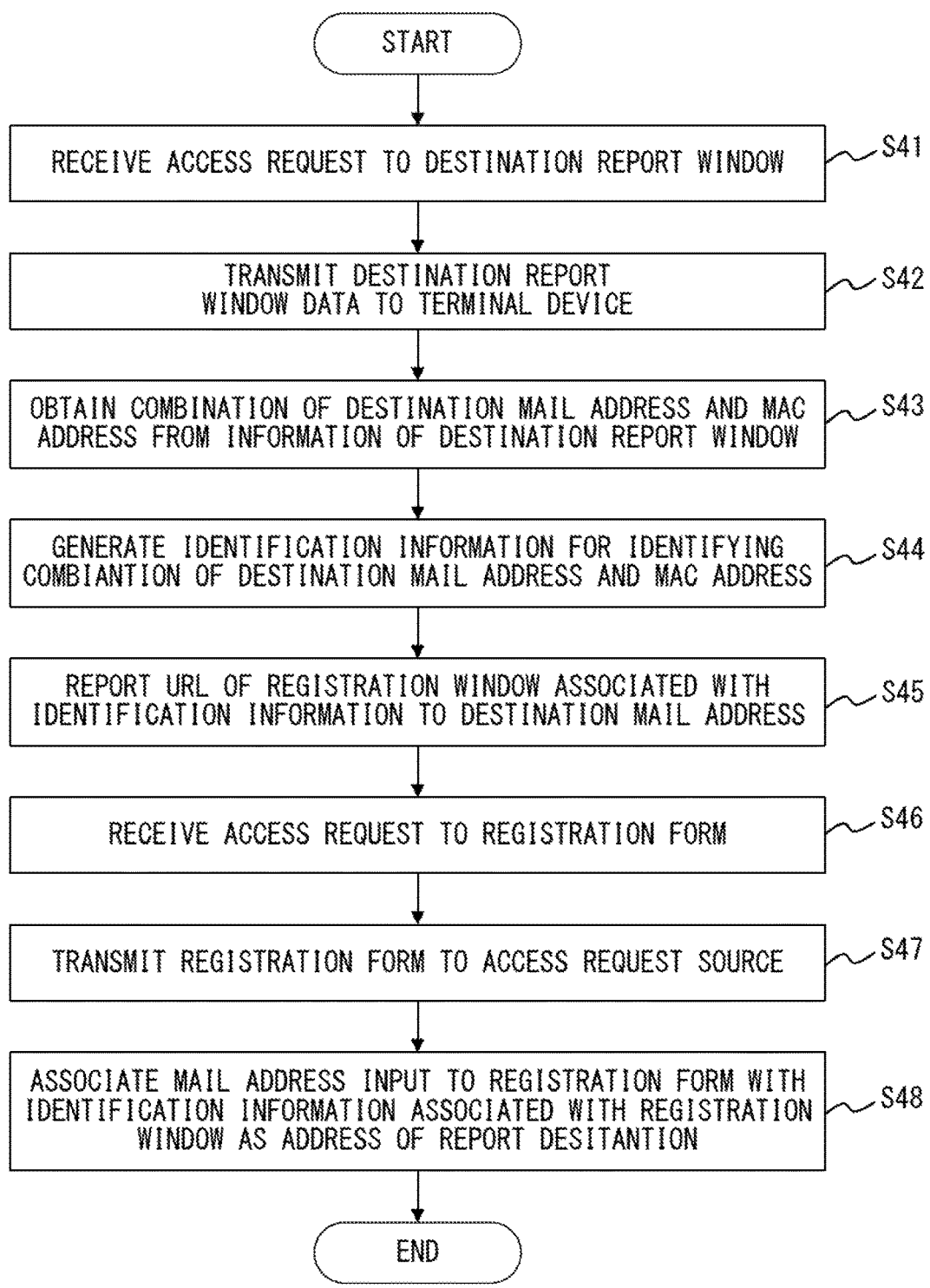
FIG. 9 is a flowchart illustrating an example of a process performed by the control device when performing a registration process.

FIG. 9 is a flowchart illustrating an example of a process performed by the control device 30 for a registration process. The reception unit 33 receives an access request to a destination report window (step S41). The obtainment unit 41 transmits data of a destination report window to the terminal device 10 via the transmission unit 32 (step S42). The obtainment unit 41 obtains a combination of the mail address (destination mail address) and the MAC address of a destination for a registration form (step S43). The obtainment unit 41 generates identification information for identifying a combination of a destination mail address and a MAC address (step S44). In this example, identification information for identifying a combination of the mail address and the MAC address of a destination for information of a registration form is used as identification information for identifying an access related for registration for a monitoring service that uses the terminal device 10 to which the MAC address in the combination is assigned. Also, the identification information is also used as information for identifying the MAC address of the terminal device 10.

The registration process unit 42 transmits a report mail that reports the URL (Uniform Resource Locator) of a registration window associated with identification information toward the destination having the destination mail address in the information of the registration form (step S45). Thereafter, the reception unit 33 receives an access request to a registration form (step S46). The registration process unit 42 transmits the data of a registration form to the access request source via the transmission unit 32 (step S47). The registration process unit 42 associates the mail address input to the registration form with the identification information associated with the registration form, while treating the mail address as the address of the report destination (step S48).

(2) Authentication of Registration

Next, explanations will be given for the authentication of registration performed between the communication device 15 and the control device 30. Note that explanations will be given for a process in a case when the operator performs a validation process for the sake of security because information registered in a process between the communication device 15 and the control device 30 includes personal information. Note that a system not including a validation process by the operator may be established in accordance with implementation.

Figure 10:
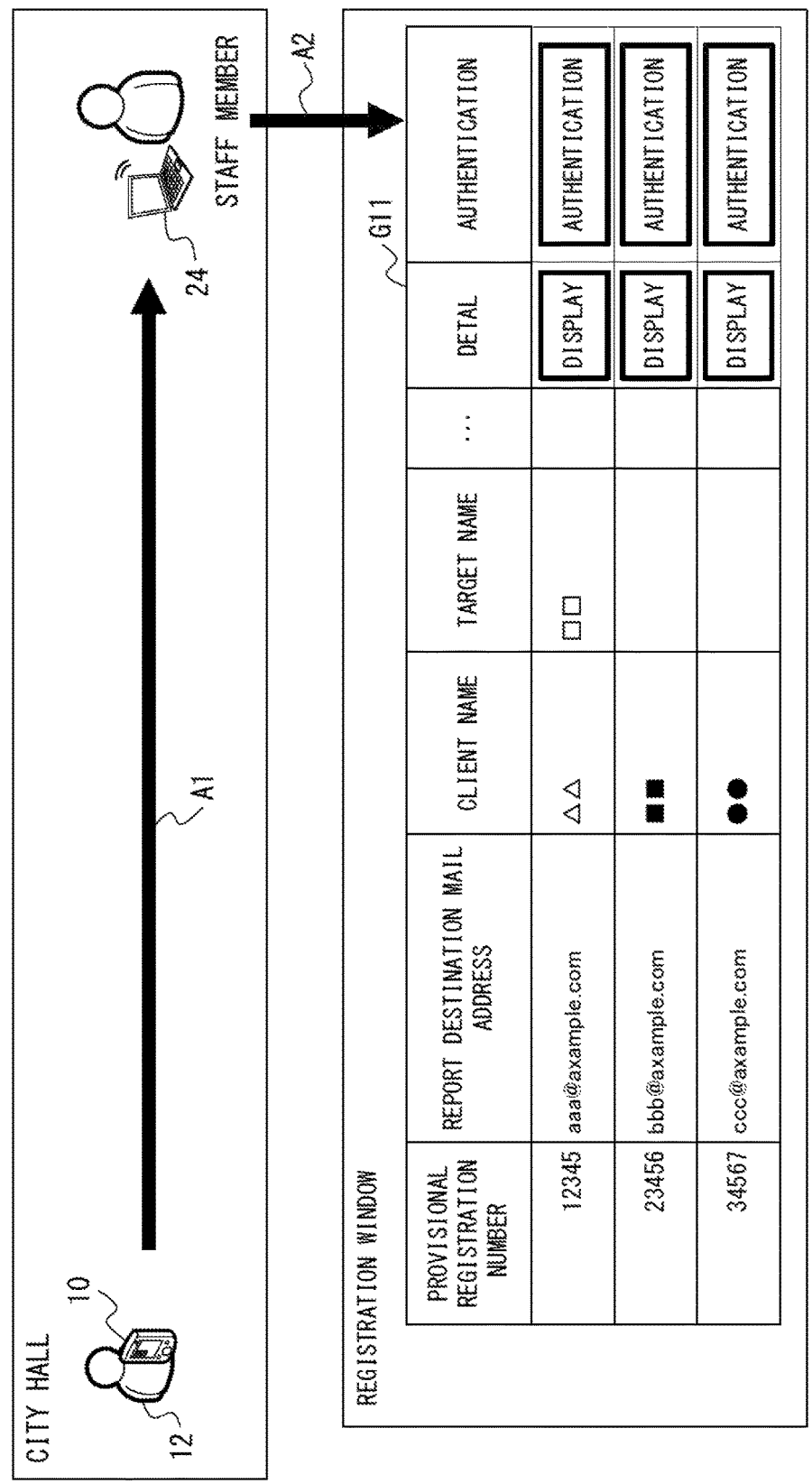
FIG. 10 illustrates an example of an authentication process.

FIG. 10 illustrates an example of an authentication process. While the processes explained by referring to FIG. 5 through FIG. 9 perform a registration process, the control device 30 does not start a report process even when it has obtained the position information of the terminal device 10 until the validation of the registration is completed.

For authentication of registration, the client 12 brings the terminal device 10 to be held by a monitoring target person of the monitoring service, the provisional registration number obtained through a registration process and an ID card of the client 12 so as to present them to the operator (arrow A1). In the example illustrated in FIG. 10, the management device 24 is installed in a city hall, and the operator is a staff member of the city hall.

As illustrated as window G11, the management device 24 includes, for each registration process performed through the control device 30, information such as a provisional registration number, a mail address of a report destination, the name of the client 12, and the name of the monitoring target person, an authentication button, and a display button. A mail address of a report destination in window G11 is a mail address specified as a report destination in a registration form. The operator performs an authentication process while referring to window G11, which is displayed on the screen of the management device 24. When a display button for "detail" is pushed, detailed information used for the registration identified by the provisional registration number in the entry is displayed.

The operator uses information presented by the client 12 so as to determine whether or not it is an unauthorized use of the monitoring system. For example, the operator determines whether or not the name of the client 12 displayed in association with the provisional registration number matches the name written on the presented ID card in window G11. When the name of the client 12 associated with the provisional registration number matches the name written on the ID card presented by the client 12 in window G11, the operator determines that it is not an unauthorized use of the monitoring system. Note that the operator may add, to a condition for determining whether or not it is an unauthorized use of a monitoring system, a condition such as a relationship between the monitoring target person and the client 12, the fact that the ID card of the client 12 is not counterfeit, etc., in accordance with the operation policy of the system.

When determining that it is not an unauthorized use of the monitoring system, the operator pushes the authentication button associated with the provisional registration number that is being processed (arrow A2). When the operator pushes the authentication button, the management device 24 transmits, to the control device 30, a start request for a report process of the registration information associated with the entry that is associated with the authentication button. A start request includes a provisional registration number. When receiving a start request via the reception unit 33, the registration process unit 42 in the control device 30 starts a report process of the position information of the terminal device 10 associated with the provisional registration number included in the start request.

Figure 11:
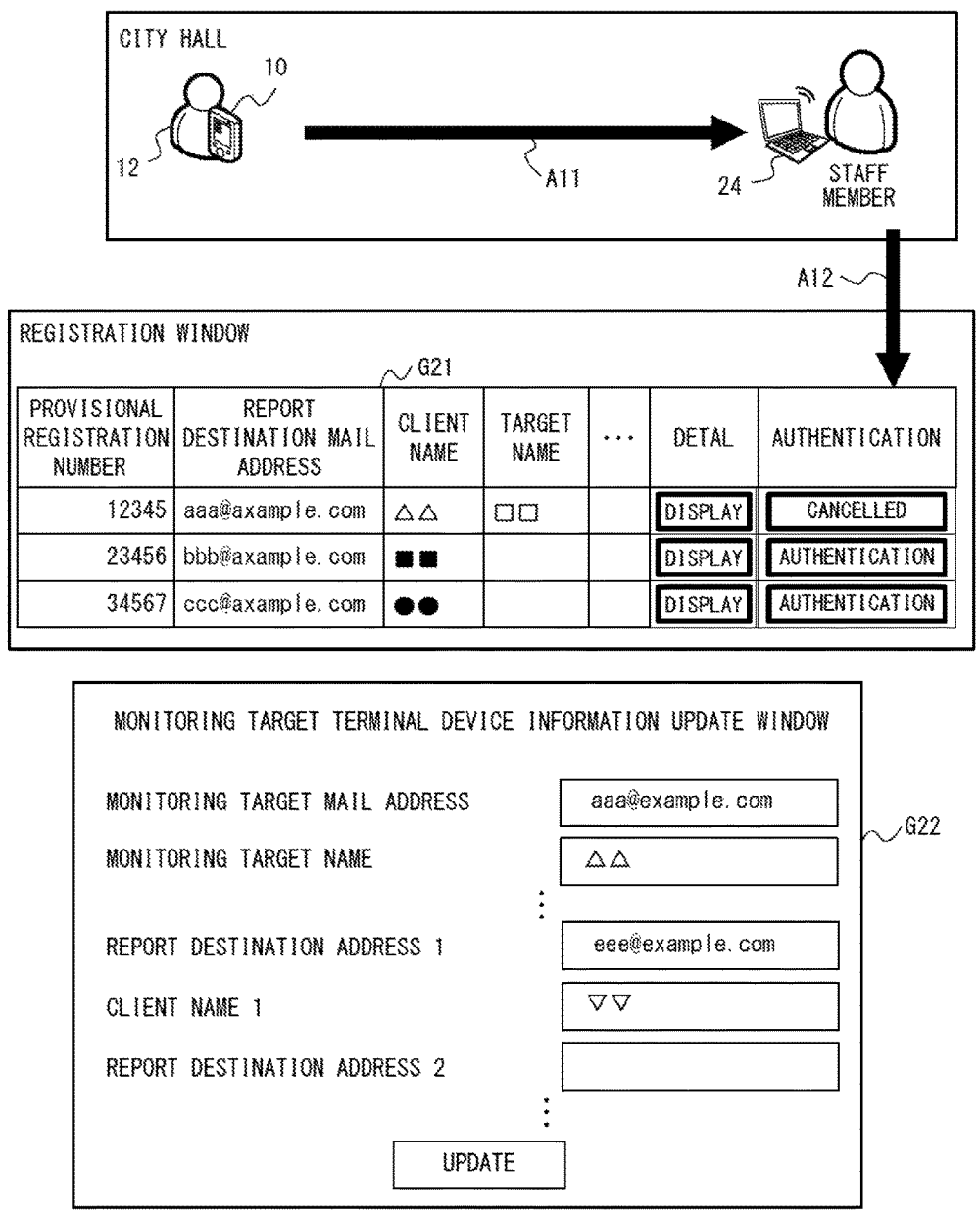
FIG. 11 illustrates an example of a change in an authentication status.

FIG. 11 illustrates an example of a change in an authentication status. The operator can cancel report setting of position information and change a report destination through manipulation via the management device 24. The client 12 who wishes to cancel or change report setting brings the terminal device 10 to be carried by the monitoring target person and the ID card of the client 12 so as to present them to the operator of the management device 24 (arrow A11). In the example illustrated in FIG. 11 as well, the management device 24 is installed in a city hall, and the operator is a staff member of the city hall. Similarly to window G11 illustrated in FIG. 10, management window G21 displayed by the management device 24 displays information such as a provisional registration number, a mail address of a report destination, the name of the client 12, the name of the monitoring target person, etc.

When the name written on the ID card presented by the client 12 matches the information of the name in window G21, the operator performs a changing process requested by the client or cancels a monitoring service (arrow A12). When cancelling a service, the operator pushes the authentication button in the entry that is in an authenticated state and thereby can cancel the authentication. In the example illustrated as window G21, when authentication is cancelled, the button displays "cancelled". Window G21 illustrates a case when the client 12 requested the registration cancellation for the registration with provisional registration number=12345.

When the client 12 requests a change of registration information, the operator pushes the display button for "detail" in an entry in an authenticated state and thereby can display monitoring target terminal device information update window G22. The operator can update registration information by pushing the update button in monitoring target terminal device information update window G22 after changing information in the monitoring target terminal device information update window in accordance with the request from the client 12. Monitoring target terminal device information update window G22 is a window similar to a registration form explained by referring to window G2 illustrated in FIG. 7, and includes a text box for inputting information similar to those for a registration form.

(3) Generation of Log by the Wireless LAN Controller 20

FIG. 12 illustrates an example of a log. For all devices, the wireless LAN controller 20 records, in a log, information of an access except probe requests from among pieces of information of accesses reported from any of the access points 5 in the system. For the terminal device 10 for which an access using an SSID for registration for the monitoring system has been detected, the wireless LAN controller 20 records a log also for the detection of a probe request.

The log illustrated in FIG. 12 includes access point (AP), MAC address, date, and type. An access point is identification information of the access point 5 for which an access has been detected. A MAC address is a MAC address assigned to a device that accessed the access point in the entry. A date is information of time when an access was detected at the access point 5. A type is the type of an access to the access point 5. When for example the wireless LAN controller 20 holds a list including MACa, MACb and MACx as information of the address of the terminal devices that made accesses by using SSIDs for registration, the log illustrated in FIG. 12 may be generated.

In the example illustrated in FIG. 12, the device to which MACx is assigned made a request to the access point 5c for validation at 10:00 on June 10. Meanwhile, the device to which MACb is assigned transmitted a probe request to the access point 5d at 11:00 on June 10. The terminal device 10 to which MACa is assigned transmitted a probe request to the access point 5a at 10:15 on June 10.

The wireless LAN controller 20 transmits the thus generated log to the control device 30 periodically. This makes it possible for the control device 30 to use a log generated by the wireless LAN controller 20 so as to identify the position of a device such as the terminal device 10 held by the monitoring target person.

Figure 13:
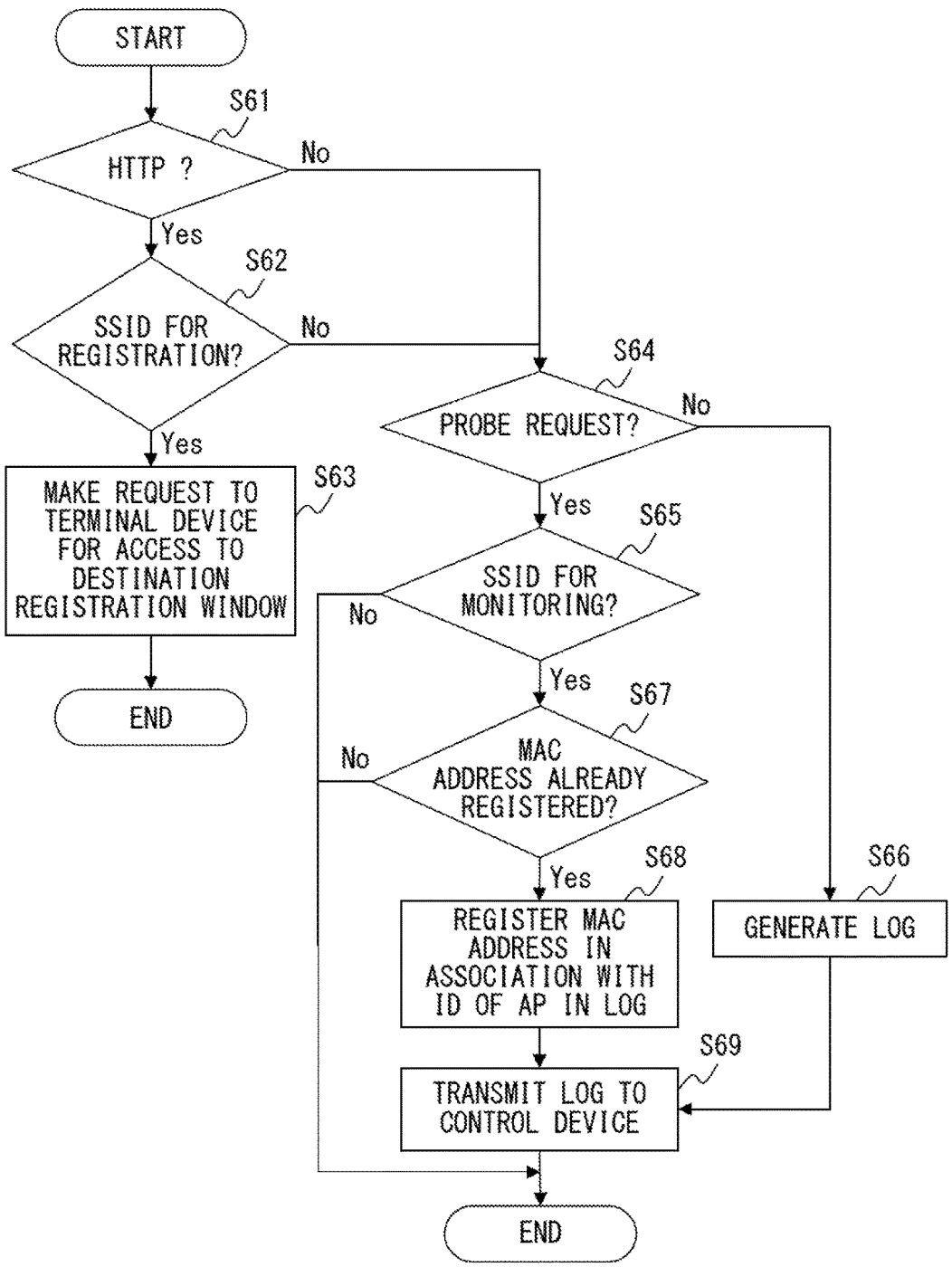
FIG. 13 is flowchart illustrating an example of a process performed by a wireless LAN controller.

FIG. 13 is a flowchart illustrating an example of a process performed by the wireless LAN controller 20. It is assumed in the example illustrated in FIG. 13 that the terminal device 10 that receives a monitoring service, after entering the communication area 3 of the access point 5, transmits a probe request including an SSID used for monitoring.

The wireless LAN controller 20 determines whether or not a communication message using HTTP has been received (step S61). When a communication message using HTTP has been received, the wireless LAN controller 20 determines whether or not the SSID is an SSID for a registration process (YES in step S61, and step S62). When receiving an HTTP packet transmitted by using an SSID for a registration process, the wireless LAN controller 20 determines that a request for a registration process is requested (YES in step S62). Then, the wireless LAN controller 20 obtains the MAC address of the terminal device 10 that transmitted the HTTP packet, and also requests an access to the destination registration window of a registration form to the terminal device 10 (step S63).

When it is determined that an HTTP packet has not been received in step S61 and when it is determined that the communication is not a communication using an SSID for registration in step S62, the wireless LAN controller 20 determines whether or not the access is transmission of a probe request (step S64). When the detected access is not transmission of a probe request, the wireless LAN controller 20 generates a log for an access that occurred (NO in step S64, and step S66). Thereafter, the wireless LAN controller 20 transmits a log to the control device 30 (step S69).

When the detected access is transmission of a probe request, the wireless LAN controller 20 determines whether or not the probe request includes an SSID for monitoring (YES in step S64, and step S65). When the probe request does not include an SSID for monitoring, the wireless LAN controller 20 terminates the process (NO in step S65).

Meanwhile, when the probe request includes an SSID for monitoring, it is determined whether or not the MAC address of the transmission source of the probe request is recorded in list L1 (YES in step S65, and step S67). When the MAC address of the transmission source of the probe request is not registered in list L1, the wireless LAN controller 20 terminates the process (NO in step S67). When the MAC address of the transmission source of the probe request is registered in list L1, the wireless LAN controller 20 registers the MAC address in a login association with the identifier of the access point 5 (YES in step S67, and step S68). Thereafter, the wireless LAN controller 20 transmits a log to the control device 30 (step S69).

(4) Identification and Report of Position Information by the Control Device 30

FIG. 14 illustrates an example of the access point information table 51. The access point information table 51 records installation positions in association with identification information of the access points 5. For example, the access point 5a (AP5a) is installed in a city hall. The access point 5b (AP5b) is installed in community center A. The access point 5c (AP5c) is installed in the gymnasium of elementary school Y, and the access point 5d (AP5d) is installed in the library of elementary school Y.

Figure 15:
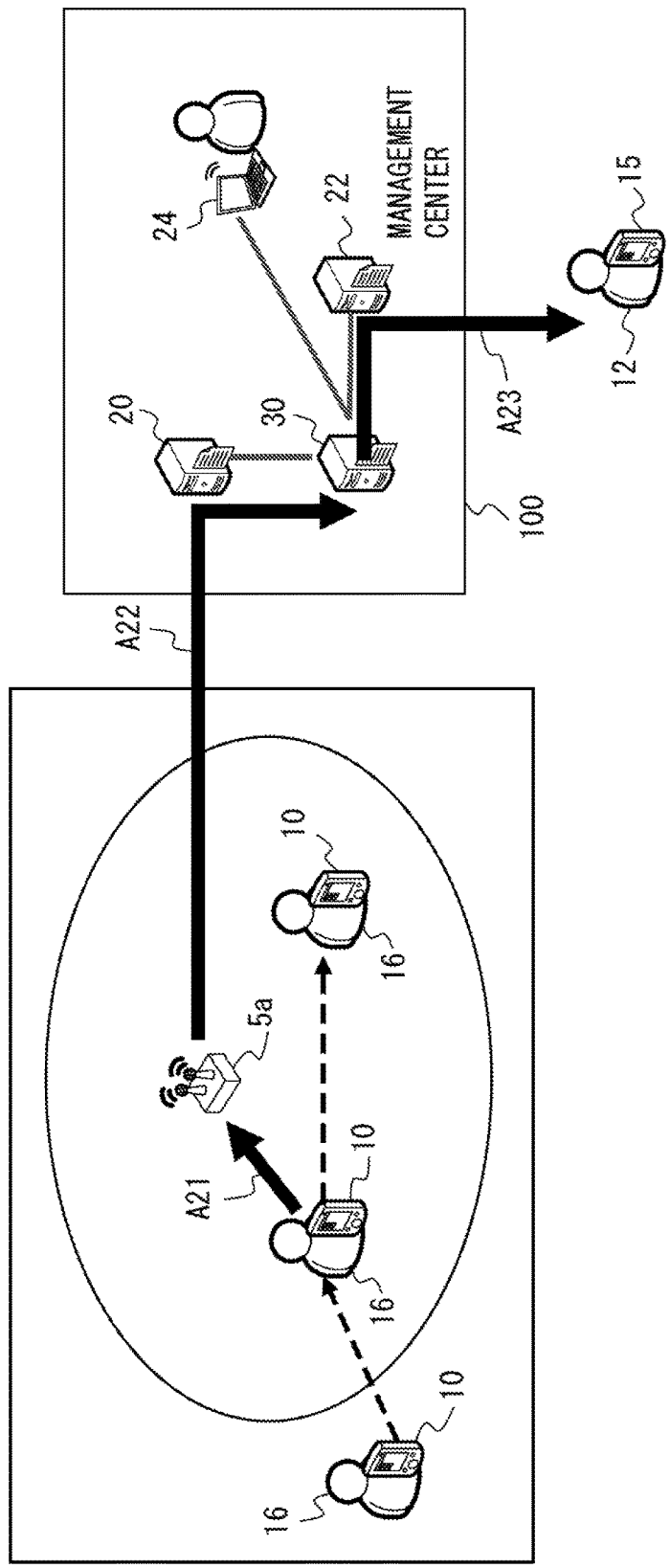
FIG. 15 illustrates an example of reporting of position information.

FIG. 15 illustrates an example of reporting of position information. The monitoring target person 16 who carries the terminal device 10 is moving. It is assumed in the example illustrated in FIG. 15 that the terminal device 10 carried by the monitoring target person 16 transmits a probe request including an SSID used for monitoring when he or she enters the communication area 3 of the access point 5. It is further assumed that the control device 30 holds the access point information table 51 illustrated in FIG. 14.

It is assumed for example that the monitoring target person 16 holding the terminal device 10 has entered the communication area 3 of the access point 5a. Then, the access point 5a receives a probe request that has MACa as the MAC address of the transmission source and that includes an SSID used for monitoring (arrow A21).

The access point 5a reports information related to the reception of the probe request to the wireless LAN controller 20 (arrow A22). In the above report, it is also reported to the wireless LAN controller 20 that the MAC address in the probe request is MACc and that the SSID used for monitoring is included. It is assumed here that the wireless LAN controller 20 holds a list including MACa as a target for which a log of a probe request is generated. Then, the wireless LAN controller 20 records the information of the probe request of MACa in a log. For example, it is assumed that the wireless LAN controller 20 generates the log illustrated in FIG. 12. Then the wireless LAN controller 20 transmits the generated log to the control device 30.

The position identification unit 43 in the control device 30 identifies that the terminal device 10 to which MACa is assigned is in the communication area of the access point 5a (AP5a) and that the access point 5a is installed in a city hall. In this case, the position identification unit 43 determines that the monitoring target person 16 holding the terminal device 10 to which MACa is assigned is in the city hall.

The report process unit 44 generates a mail for reporting the identification result obtained by the position identification unit 43 and transmits the mail to the report destination that is associated with MAC address=MACa. It is assumed for example that the control device 30 holds the report target table 52-2 (FIG. 8). In such a case, the report process unit 44 transmits, to aaa@example.com and mimamori_1@xx.yy, a mail reporting that the monitoring target person 16 holding the terminal device 10 to which MACa is assigned is in a city hall (arrow A23). Thus, the transmitted mail is transmitted to a report destination such as the communication device 15 that the client 12 is holding, via the mail server 22 in the system.

Figure 16:
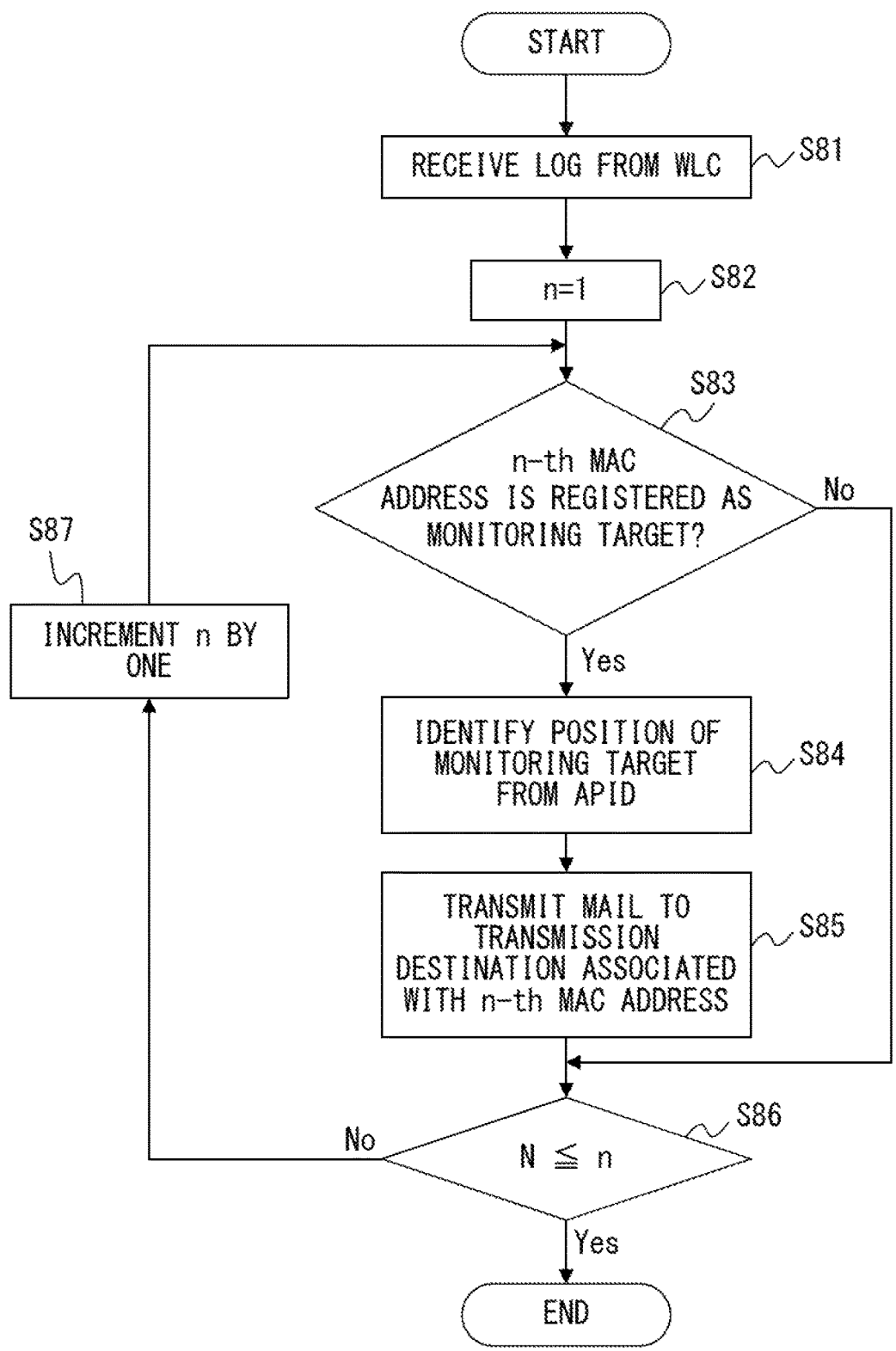
FIG. 16 is a flowchart illustrating an example of a process performed by the control device.

FIG. 16 is a flowchart illustrating an example of a process performed by the control device 30. The process illustrated in FIG. 16 uses variable n and constant N. Variable n is used for counting the number of addresses that became a target of a process in a log. Constant N is the total number of the MAC addresses included in a log.

The reception unit 33 in the control device 30 receives a log from the wireless LAN controller 20 (step S81). The reception unit 33 guides the log to the position identification unit 43. The position identification unit 43 sets variable n to 1 (step S82). The position identification unit 43 compares the n-th MAC address included in a log with a MAC address registered in the report target table 52 so as to determine whether or not the n-th MAC address is registered as a monitoring target (step S83).

When the MAC address is registered as a monitoring target, the position identification unit 43 identifies the position of the terminal device 10 as a monitoring target from the identifier of the access point 5 (APID) associated with the n-th MAC address (step S84). The report process unit 44 generates a mail for reporting the identification result obtained by the position identification unit 43. Further, the report process unit 44 transmits a mail to the report destination associated with the n-th MAC address (step S85). The position identification unit 43 determines whether or not variable n is equal to or greater than constant N (step S86). When variable n is smaller than constant N, the position identification unit 43 increments variable n by one, and repeats the processes of steps S83-S85 (NO in step S86, and step S87). When variable n is equal to or greater than constant N, the position identification unit 43 terminates the process (YES in step S86).

When it is determined in step S83 that the n-th MAC address is not a MAC address registered as a monitoring target, the process of the position identification unit 43 moves to step S86 (NO in step S83).

As described above, because the position information of the terminal device 10 held by the monitoring target person 16 is reported to the communication device 15 etc. of the client 12, the client 12 can know the position of the monitoring target person 16 even when he or she is away from the monitoring target person 16. Also, reporting of detection statuses of the plurality of access points 5 to the communication device 15 by a time series makes it possible for the client 12 to know the movement statuses of the monitoring target person 16.

Figure 17:
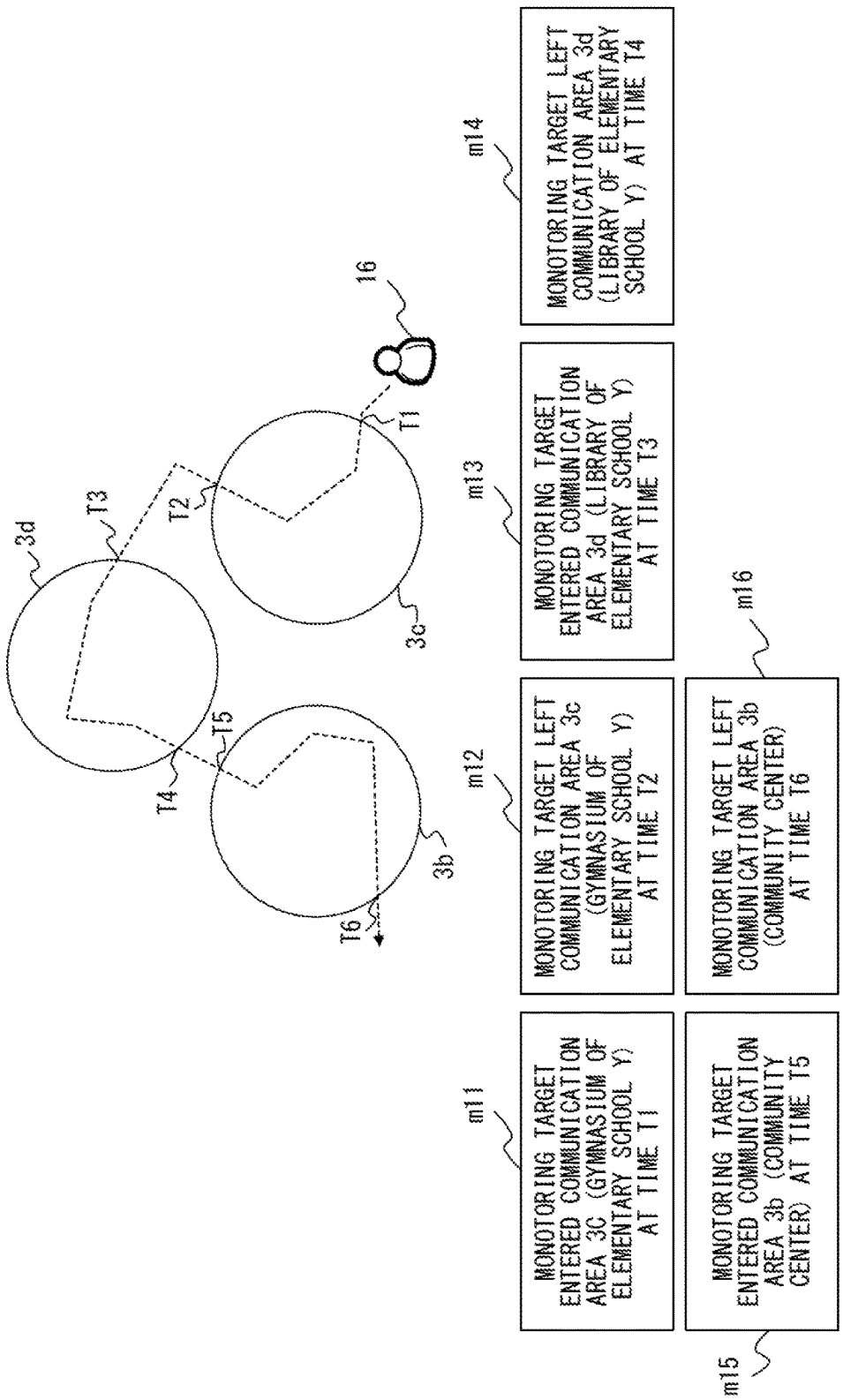
FIG. 17 illustrates another example of reporting of position information.

FIG. 17 illustrates another example of reporting of position information. It is assumed for example that the monitoring target person 16 who carries the terminal device 10 moves around the installation positions of the access points 5b through 5d. While FIG. 17 does not illustrate the access points 5 for facilitating the understanding of the figure, it is assumed that the communication area 3b is formed by the access point 5b and the communication area 3c is formed by the access point 5c. Further, the communication area 3d is formed by the access point 5d. The dotted arrow in FIG. 17 represents a movement route of the monitoring target person 16. It is also assumed that the MAC address of the terminal device 10 is MACa in the example of FIG. 17 as well.

It is assumed that the monitoring target person 16 enters the communication area 3c at time T1. Then, the terminal device 10 transmits a probe request to the access point 5c. The access point 5c reports, to the wireless LAN controller 20, information of the access from the terminal device 10. The wireless LAN controller 20 determines whether or not the MAC address of the terminal device 10 is included in list L1 (FIG. 6) related to the generation of a log for a probe request. When the MAC address of the terminal device 10 is included in list L1, the wireless LAN controller 20 transmits a log including the information below to the control device 30.

Access point: access point 5c
Access time: T1
MAC address of device that made access: MACa When obtaining a log via the reception unit 33, the position identification unit 43 in the control device 30 refers to the report target table 52-2 (FIG. 8) so as to determine whether or not the log includes an access made by a device registered as a process target of the monitoring service. The report target table 52-2 includes an entry for the device with MAC address=MACa. Accordingly, the position identification unit 43 determines to report the position information of MACa to the report destination in the entry for the device with MAC address=MACa, and also identifies the position of the device (terminal device 10) as the report target by using the access point information table 51 (FIG. 14). In the example illustrated in FIG. 17, the monitoring target person 16 enters the communication area 3c at time T1 and the access point 5c that forms the communication area 3c is installed in the gymnasium of elementary school Y. Thus, the position identification unit 43 determines the monitoring target person 16 holding the terminal device 10 is in the gymnasium of elementary school Y.

The report process unit 44 generates a report mail for transmitting the determination result obtained by the position identification unit 43 to the report destination in the entry for MAC address=MACa. For example, the report process unit 44 can generate mail m11 as a mail for reporting the position of the terminal device 10 at time T1. Mail m11 is a mail for reporting information that the monitoring target person 16 is in the gymnasium of elementary school Y at time T1, and the mail address of a report destination associated with terminal device 10 is set as the destination for the mail. The report process unit 44 transmits mail m11 to the mail server 22 via the transmission unit 32. The mail server 22 transmits mail m11 toward the communication device 15 as a destination. Thus, the client 12 can identify the position of the monitoring target person 16 at time T1 by reading the mail delivered to the communication device 15.

It is assumed that the monitoring target person 16 thereafter moves while carrying the terminal device 10, resulting in disconnection between the terminal device 10 and the access point 5c at time T2. Then, the access point 5c reports the disconnection of a communication with the terminal device 10 to the wireless LAN controller 20. In response to this, the wireless LAN controller 20 transmits the occurrence of the disconnection to the control device 30 after recording it in a log. The position identification unit 43 in the control device 30 performs a process similar to that for the log that recorded the information of the access that occurred at time T1. Thus, the position identification unit 43 identifies that the monitoring target person 16 leaves the communication area 3c installed in the gymnasium of elementary school Y at time T2. Then, the report process unit 44 generates the mail 12 illustrated in FIG. 17.

It is assumed that the monitoring target person 16 enters the communication area 3d while carrying the terminal device 10 at time T3. Because information of a communication between the terminal device 10 and the access point 5d is reported to the wireless LAN controller 20 from the access point 5d, the wireless LAN controller 20 transmits, to the control device 30, a log indicating that the terminal device 10 is communicating with the access point 5d. The position identification unit 43 in the control device 30 processes the obtained log similarly to the log that recorded the information of the access that occurred at time T1 and thereby determines that the terminal device 10 is in the communication area 3d that is installed in the gymnasium of elementary school Y. Thus, the report process unit 44 transmits mail m13 illustrated in FIG. 17 to a communication destination via the mail server 22, the communication destination being associated with the terminal device 10.

It is assumed that the monitoring target person 16 leaves the communication area 3d while carrying the terminal device 10 at time T4. The access point 5d reports the disconnection of a communication with the terminal device 10 to the wireless LAN controller 20. Then, the wireless LAN controller 20 transmits the occurrence of the disconnection to the control device 30 after recording it in a log. The position identification unit 43 in the control device 30 processes the obtained log similarly to the log that recorded the information of the access that occurred at time T1. Thus, the position identification unit 43 identifies that the monitoring target person 16 leaves the communication area 3d installed in the library of elementary school Y at time T4. Then, the report process unit 44 generates mail m14 illustrated in FIG. 17.

It is assumed that the monitoring target person 16 enters the communication area 3b while carrying the terminal device 10 at time T5. Because information related a communication between the terminal device 10 and the access point 5b is reported to the wireless LAN controller 20, the wireless LAN controller 20 transmits, to the control device 30, a log indicating that the terminal device 10 is communicating with the access point 5b. The position identification unit 43 in the control device 30 processes the obtained log similarly to the log that recorded the information of the access that occurred at time T1 and thereby determines the terminal device 10 is in the communication area 3b that is installed in community center A. Thus, the report process unit 44 transmits mail m15 illustrated in FIG. 17 to a communication destination associated with the terminal device 10.

It is assumed that the monitoring target person 16 leaves the communication area 3b while carrying the terminal device 10. The access point 5b reports the disconnection of a communication with the terminal device 10. In response to this, the wireless LAN controller 20 transmits the occurrence of the disconnection to the control device 30 after recording it in a log. The position identification unit 43 in the control device 30 performs, on the obtained log, a process similar to that for the log that recorded the information of the access that occurred at time T1. Thus, the position identification unit 43 identifies that the monitoring target person 16 leaves the communication area 3b installed in the community center at time T6. Then, the report process unit 44 generates the mail 16 illustrated in FIG. 17.

As described by referring to FIG. 17, using a plurality of pieces of information reported by a time series makes it possible for the client 12 to know the movement status of the monitoring target person 16.

Second Embodiment

Figure 18:
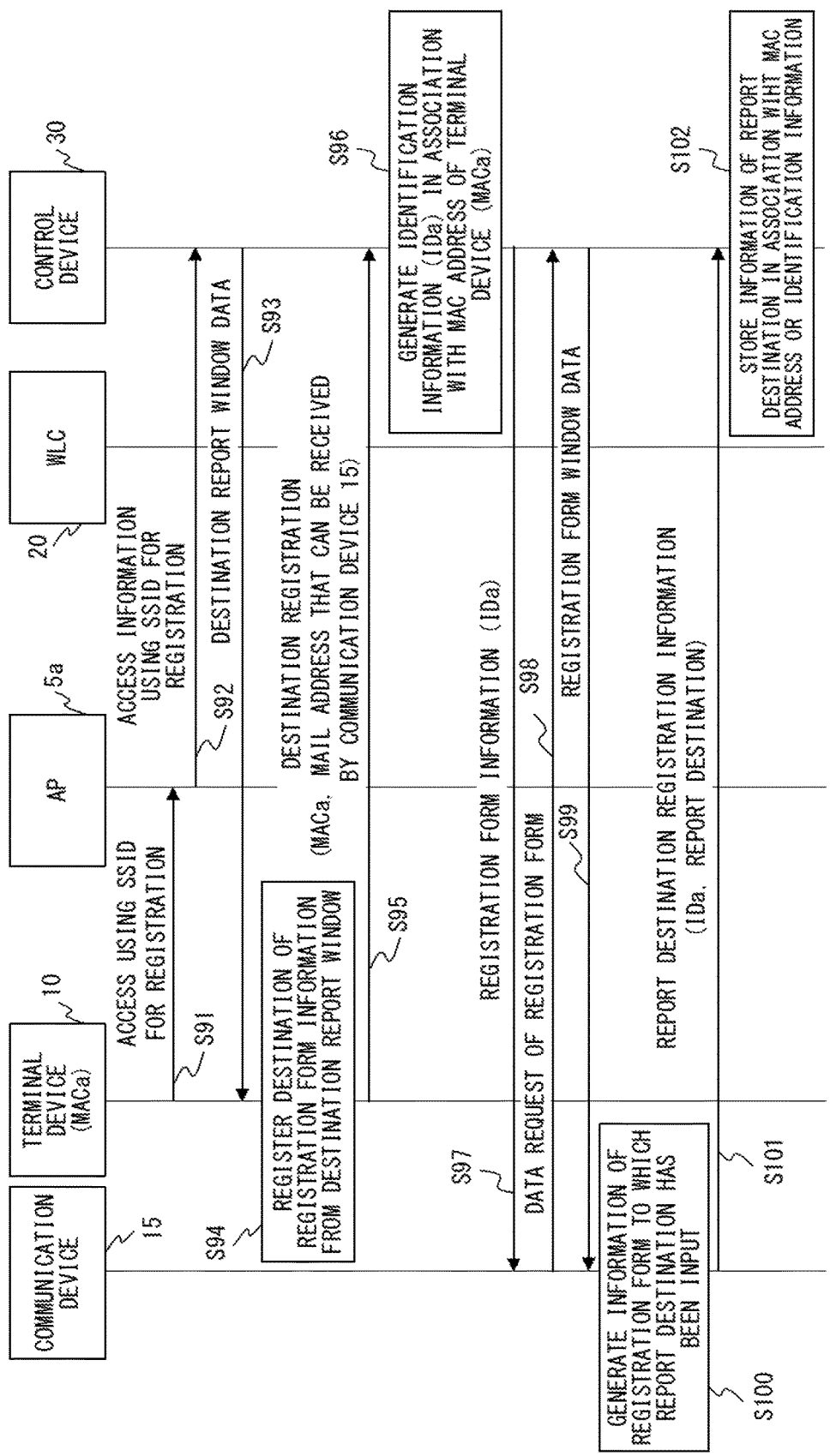
FIG. 18 is a sequence diagram illustrating an example of a registration process in a second embodiment.

FIG. 18 is a sequence diagram illustrating an example of a registration process in the second embodiment. In the second embodiment, explanations will be given for a case where the wireless LAN controller 20 does not perform a redirection process and the control device 30 obtains information of a communication that uses an SSID for registration from the wireless LAN controller 20.

It is assumed that the client 12 enters the communication area 3 of the access point 5a while carrying the terminal device 10 and accesses the access point 5a from the terminal device 10 by using an SSID for registration (step S91). The access point 5a reports to the wireless LAN controller 20 that the terminal device 10 is making an access by using an SSID for registration. Further, the wireless LAN controller 20 reports, to the control device 30, information of the access made by using an SSID for registration (step S92). In the second embodiment as well, when recognizing an access made by the terminal device 10 to one of the access points 5 by using an SSID for registration, the wireless LAN controller 20 registers the MAC address of the terminal device 10 in list L1.

Via the reception unit 33, the obtainment unit 41 in the control device 30 obtains information reported from the wireless LAN controller 20. The obtainment unit 41 obtains the MAC address of the terminal device 10. Further, the obtainment unit 41 transmits data of a destination report window of a registration form to the terminal device 10 (step S93). The processes in steps S94-S96 are similar to those in steps S26-S28, which were explained by referring to FIG. 5. Further, the processes in steps S97-S102 are similar to those in steps S31-S36, which were explained by referring to FIG. 7.

As described in the second embodiment, when the wireless LAN controller 20 does not perform a redirection process, the wireless LAN controller 20 and the terminal device 10 less communicate to each other than in the first embodiment. This makes the process loads on the wireless LAN controller 20 smaller than that in the first embodiment.

VARIATION EXAMPLES

The embodiments are not limited to the above, and allow many different variations. Some of the examples of such variations will be described below.

(1) Variation Example 1

While the first and second embodiments exemplified process for a case where the terminal device 10 is detected by using a probe request transmitted from the terminal device 10, a signal used for detecting the terminal device 10 is not limited to a probe request. For example, the position of the terminal device 10 may be detected by using an arbitrary control signal, such as a validation request transmitted from the terminal device 10, that includes its own MAC address. Also when the position of the terminal device 10 is detected by using a control message that other than the probe request, the access point 5 transfers a control signal received from the terminal device 10 to the wireless LAN controller 20. When the type of a control signal is not a probe request, the wireless LAN controller 20 records information of the access from the terminal device 10 in a log as explained by referring to FIG. 13 (NO in step S64, and step S66). The generated log is transmitted from the wireless LAN controller 20 to the control device 30. This makes it possible for the control device 30 to determine that the terminal device 10 is in the communication area 3 that is formed by the access point 5 serving as the connection destination for the terminal device 10 when a log generated by using a signal that is not a probe request includes the MAC address of the terminal device 10.

According to this variation, it is possible to identify the position of the terminal device 10 by using a MAC address included in a control signal generated after the terminal device 10 is connected to the access point 5 even when the MAC address generated at random is used by the terminal device 10 for making a probe request.

(2) Variation Example 2

A configuration is also possible in which the wireless LAN controller 20 holds, in a list and as information of a monitoring target device, only the MAC address of the terminal device 10 for which the registration process is completed. In such a case, the wireless LAN controller 20 does not store the MAC address of a device that made an access to the access point 5 by using an SSID for registration at a stage of a report from the access point 5. Each time a registration process for a monitoring process target device is terminated, the registration process unit 42 in the control device 30 reports, to the wireless LAN controller 20, the MAC address of the device for which the registration process has been performed. The wireless LAN controller 20 stores, in a list, a MAC address reported from the registration process unit 42.

According to this variation, the wireless LAN controller 20 generates a log regarding a probe only for devices for which the registration processes to the control device 30 have been completed. This eliminates the necessity for the wireless LAN controller 20 to generate a log for the terminal device 10 for which the registration process is interrupted halfway even when a probe request is transmitted. This reduces process loads on the wireless LAN controller 20.

(3) Variation Example 3

When the monitoring target person 16 moves often, mails reporting the position of the monitoring target person 16 are frequently delivered to the communication device 15, leading to a possibility that such mails will trouble the client 12. Accordingly, the report process unit 44 may categorize a plurality of access points into a plurality of groups by their installation positions. In such a case, the report process unit 44 excludes, from reporting targets, movements of the terminal device 10 made within a prescribed period of time between the communication areas 3 that are formed by the access points 5 belonging to the same group.

For example, the report process unit 44 may treat access points as ones belonging to the same group when the character strings of pieces of the installation position information of them partially match each other. In the case of FIG. 14, because the access point 5c and the access point 5d are installed in elementary school Y, they are treated as ones belonging to one group. It is assumed in this situation that the monitoring target person 16 moves as represented by the arrow in FIG. 17. In such a case, the monitoring target person 16 enters the communication area 3d at time T3 after leaving the communication area 3c at time T2. The communication area 3c and the communication area 3d are generated by access points belonging to the same group. Accordingly, movements from the communication area 3c to the communication area 3d are not reported by the control device 30 to the communication device 15 if the period of time from T2 to T3 is shorter than a specified threshold. In other words, the report process unit 44 generates neither mail m12 based on the movement at time T2 nor mail m13 based on the movement at time T3. Accordingly, no mails are transmitted to the communication device 15 between the transmission of mail m11 based on the movement at time T1 and the transmission of mail m14 based on the movement at time T4. This increases the convenience of the client 12 and also reduces the process loads on the control device 30.

Note that various methods of setting groups and various methods of identifying groups can be adopted in accordance with implementation.

(4) Variation Examples of Registration Completion Window and Authentication Process While a case has been exemplified where the control device 30 transmits a registration completion window to the communication device 15 so that a provisional registration number is reported to the client 12 and the fact that an authentication process can be performed in the management center 100 is reported, a registration completion window is not limited to the form illustrated as G3 in FIG. 7. For example, a registration completion window may display a two-dimensional code. When a registration completion window using a two-dimensional code is transmitted to the communication device 15, the client 12 prints out the registration completion window so as to bring it to the management center 100. Further, the client 12 submits the printed two-dimensional code to an operator of the management center 100 together with the terminal device 10 and the ID card of the client 12 himself or herself. Thereby, the operator can search for the information of the client 12 and the terminal device 10 associated with the two-dimensional code by using the two-dimensional code. Also, the client 12 may present the communication device 15 that is displaying a registration completion window to an operator of the management center 100 instead of printing out a two-dimensional code. In such a case, the operator can access the information of the process target through the two-dimensional code on the window of the communication device 15 presented by the client 12.

Further, in a registration completion window, registration may be confirmed by using a user ID that is available to the management center 100. When for example the management center 100 is in the city hall, identification information for identifying the client 12 for processes in the city hall may be included in a registration completion report. In such a case, correspondence information between identification information used for processes performed by the city government and the names of its citizens is recorded by the management device 24 in the control device 30 in advance. The registration process unit 42 in the control device 30 uses the name of the client 12 for whom the registration process is being performed, and identifies the identification information, and includes the identified identification information in the registration window.

(5) Others

The examples of the windows and information elements in the tables used in the above explanations are just exemplary, and they may be changed in an arbitrary manner in accordance with implementation.

When the control device 30 operates as an SDN controller, the control device 30 may perform a setting process of the wireless LAN controller 20. Also, the control device 30 may control the access points 5 via the wireless LAN controller 20 or may control the access points 5 directly.

In the first embodiment and other examples described above, it is assumed that an SSID for registration and an SSID for monitoring are different from each other, however, one SSID may function both for registration and monitoring. Further, an arbitrary SSID may be used for a monitoring process. When an arbitrary SSID is used for a monitoring process, the position identification unit 43 uses a log for communications using the arbitrary SSID so as to identify the position of the terminal device 10.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present inventions have been described in detail, it should be understood that the various changes, substitutions, and alterations could be made hereto without departing from the spirit and scope of the invention.

What is claimed is:

1. A non-transitory computer-readable recording medium having stored therein a program for causing a computer that controls a network including a plurality of access points to execute a reporting process, the reporting process comprising:

obtaining an address that is assigned to a target device configured to communicate with one of the plurality of access points and information of a communication device that makes registration for a monitoring service;

storing identification information in a storage unit in association with the address of the target device, the identification information identifying an access related to the registration of the monitoring service;

reporting the identification information to the communication device;

storing, when receiving report destination information and the identification information from the communication device, the report destination information in the storage unit in association with the address of the target device, the report destination information being used for identifying a report destination for information of the target device;

referring to the storage unit when obtaining information of a control signal received by one of the plurality of access points; and reporting, when a source address of the control signal is the address of the target device, to the report destination that there is an access from the target device.

2. The non-transitory computer-readable recording medium according to claim 1, wherein the computer has information associating an identifier of an access point and an installation position of the access point for each of the plurality of access points, and wherein the reporting process includes:

obtaining a source address of the control signal together with an identifier of an access point that received the control signal;

identifying an installation position of an access point that received the control signal when the source address of the control signal exists in the storage unit; and reporting the installation position to a report destination stored in association with the source address of the control signal.

3. The non-transitory computer-readable recording medium according to claim 2, wherein when a connection between a first access point that received a control signal from the target device and the target device is disconnected, the reporting process determines that the target device moved out of a first communication area generated by the first access point and reports to the report destination that the target device moved out of the first communication area, and when it is reported that a second access point receives a different control signal from the target device, the reporting process reports to the report destination that the target device moved to a second communication area generated by the second access point.

4. The non-transitory computer-readable recording medium according to claim 2, wherein the computer is capable of communicating with a wireless controller that obtains an address of the target device from a signal transmitted by using a service set identifier that is used when the target device reports the address of the target device to the computer, the reporting process receives, from the wireless controller, a combination of a fact that a connection request was transmitted to one of the plurality of access points from the address of the target device and an identifier of an access point that received the connection request; and the reporting process determines that the target device is in a communication area formed by an access point that is identified by the identifier in the combination.

5. A control device comprising:

a processor configured to obtain an address that is assigned to a target device configured to communicate with one of a plurality of access points and information of a communication device that makes registration for a monitoring service; and a storage unit configured to store identification information in association with the address of the target device, the identification information identifying an access related to the registration of the monitoring service;

reporting the identification information to the communication device, wherein the processor receives report destination information and the identification information from the communication device, the processor stores the report destination information in the storage unit in association with the address of the target device, the report destination information being used for identifying a report destination for information of the target device, and the processor reports, when a source address of a control signal used for a communication with one of the plurality of access points is the address of the target device, to the report destination that there in an access from the target device.

6. The control device according to claim 5, wherein the processor identifies an installation position of an access point that received the control signal, by using information associating an identifier of the access point and an installation position of the access point, when the source address of the control signal exists in the storage unit, and the processor reports the installation position of the access point that received the control signal to a report destination stored in association with the transmission source address of the control signal.

7. The control device according to claim 6, wherein when a connection between a first access point that received a control signal from the target device and the target device is disconnected, the processor determines that the target device moved out of a first communication area generated by the first access point and reports to the report destination that the target device moved out of the first communication area, and when it is reported that a second access point received a different control signal from the target device, the processor reports to the report destination that the target device moved to a second communication area generated by the second access point.

8. A reporting method performed by a computer that controls a network including a plurality of access points, the reporting method comprising:

obtaining an address that is assigned to a target device configured to communicate with one of the plurality of access points and information of a communication device that makes registration for a monitoring service;

storing identification information in a storage unit in association with the address of the target device, the identification information identifying an access related to the registration of the monitoring service;

reporting the identification information to the communication device;

storing, when receiving report destination information and the identification information from the communication device, the report destination information in the storage unit in association with the address of the target device, the report destination information being used for identifying a report destination for information of the target device;

referring to the storage unit when obtaining information of a control signal received by one of the plurality of access points; and reporting, when a source address of the control signal is the address of the target device, to the report destination that there is an access from the target device.

9. The reporting method according to claim 8, wherein the computer has information associating an identifier of an access point and an installation position of the access point for each of the plurality of access points, and wherein the reporting method includes:

obtaining a source address of the control signal together with an identifier of an access point that received the control signal;

identifying an installation position of an access point that received the control signal when the source address of the control signal exists in the storage unit; and reporting the installation position to a report destination stored in association with the source address of the control signal.

10. The reporting method according to claim 9, wherein when a connection between a first access point that received a control signal from the target device and the target device is disconnected, the computer determines that the target device moved out of a first communication area generated by the first access point and reports to the report destination that the target device moved out of the first communication area, and when it is reported that a second access point receives a different control signal from the target device, the computer reports to the report destination that the target device moved to a second communication area generated by the second access point.

11. The reporting method according to claim 9 wherein the computer is capable of communicating with a wireless controller that obtains an address of the target device from a signal transmitted by using a service set identifier that is used when the target device reports the address of the target device to the computer, the computer receives, from the wireless controller, a combination of a fact that a connection request was transmitted to one of the plurality of access points from the address of the target device and an identifier of an access point that received the connection request; and the computer determines that the target device is in a communication area formed by an access point that is identified by the identifier in the combination.

* * * * *